(12) United States Patent
Klosin et al.

(10) Patent No.: US 8,318,874 B2
(45) Date of Patent: Nov. 27, 2012

(54) PROCESS OF SELECTIVELY POLYMERIZING ETHYLENE AND CATALYST THEREFOR

(75) Inventors: Jerzy Klosin, Midland, MI (US); Dean M. Welsh, Midland, MI (US)

(73) Assignee: Dow Global Technologies LLC

( * ) Notice: Subject to any disclaimer, the term of this patent is extended or adjusted under 35 U.S.C. 154(b) by 211 days.

(21) Appl. No.: 12/797,667

(22) Filed: Jun. 10, 2010

(65) Prior Publication Data

US 2010/0331492 A1 Dec. 30, 2010

Related U.S. Application Data

(60) Provisional application No. 61/220,605, filed on Jun. 26, 2009.

(51) Int. Cl.
*C08F 4/06* (2006.01)
*C08F 4/04* (2006.01)
*C08F 2/00* (2006.01)
*B01J 31/00* (2006.01)
*B01J 27/24* (2006.01)

(52) U.S. Cl. ..... 526/118; 526/113; 526/172; 526/218.1; 526/236; 502/167; 502/200

(58) Field of Classification Search .......... 502/167, 502/200; 526/218.1, 217, 236
See application file for complete search history.

(56) References Cited

U.S. PATENT DOCUMENTS

| | | | |
|---|---|---|---|
| 5,405,924 A * | 4/1995 | Kelsey | 526/142 |
| 6,114,481 A | 9/2000 | McMeeking et al. | |
| 6,268,444 B1 | 7/2001 | Klosin et al. | |
| 6,515,155 B1 | 2/2003 | Klosin et al. | |
| 6,696,379 B1 | 2/2004 | Carnahan et al. | |
| 7,163,907 B1 | 1/2007 | Canich et al. | |
| 7,355,089 B2 | 4/2008 | Chang et al. | |
| 2003/0004286 A1 | 1/2003 | Klosin et al. | |
| 2003/0130451 A1 * | 7/2003 | Arndt-Rosenau et al. | 526/161 |
| 2004/0010103 A1 | 1/2004 | Boussie et al. | |
| 2006/0199930 A1 | 9/2006 | Shan et al. | |
| 2007/0111883 A1 | 5/2007 | Jayaratne et al. | |
| 2007/0167315 A1 | 7/2007 | Arriola et al. | |
| 2007/0167578 A1 | 7/2007 | Arriola et al. | |
| 2008/0311812 A1 | 12/2008 | Arriola et al. | |
| 2009/0047459 A1 * | 2/2009 | Behrens | 428/41.3 |

FOREIGN PATENT DOCUMENTS

| | | |
|---|---|---|
| WO | 03040195 | 5/2003 |
| WO | 03051935 | 6/2003 |
| WO | 2004024740 | 3/2004 |
| WO | 2005090425 | 9/2005 |
| WO | 2005090426 | 9/2005 |
| WO | 2005090427 | 9/2005 |
| WO | 2005123790 | 12/2005 |
| WO | 2009012215 | 1/2009 |
| WO | 2009097560 | 8/2009 |

OTHER PUBLICATIONS

Adams et al., "Discovery and evaluation of highly active imidotitanium ethylene polymerisation catalysts using high throughput catalyst screening", Chemical Communications, 2004, pp. 434-435, The Royal Society of Chemistry.

Adams et al., Evaluation of the relative importance of Ti-Cl H-N. hydrogen bonds and supramolecular interactions between perfluorophenyl rings in the crystal structures of [Ti(NR)C12(NHMe2)2] (R = iPr, C6H5 or C6F5), Chemical Communications, 2001, pp. 2738-2739, The Royal Society of Chemistry.

Hayday et al., "Imido titanium compounds bearing the 6-dimethylamino-1,4,6-trimethyl-1,4-diazacycloheptane ligand: synthesis, structures, solution dynamics and ethylene polymerisation capability", Dalton Transactions, 2008, pp. 3301-3310, No. 25, RSC Publishing.

Nielson et al., "2-tert-Butyl and 2-phenylphenylimido complexes of titanium (IV) and their olefin polymerisation activity", Journal of the Chemical Society, Dalton Transactions, 2001, pp. 232-239, No. 3, The Royal Society of Chemistry.

* cited by examiner

*Primary Examiner* — David W Wu
*Assistant Examiner* — Elizabeth Eng

(57) ABSTRACT

The present invention generally relates to a process that selectively polymerizes ethylene in the presence of an alpha-olefin, and a precatalyst and catalyst useful in such processes.

15 Claims, No Drawings

PROCESS OF SELECTIVELY POLYMERIZING ETHYLENE AND CATALYST THEREFOR

CROSS-REFERENCE TO RELATED APPLICATIONS

This application claims benefit of U.S. Provisional Patent Application No. 61/220,605, filed Jun. 26, 2009, the entire contents of which are hereby incorporated herein by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention generally relates to a process that selectively polymerizes ethylene in the presence of an alpha-olefin, and a precatalyst and catalyst useful in such process.

2. Description of the Related Art

Polyolefins that are polyethylene polymer (also known as polyethene or poly(methylene)) and poly(ethylene alpha-olefin) copolymers are types of polyolefins (also known as polyalkenes) widely used in industry. They are desirable for making, for example, containers, tubing, films and sheets for packaging, and synthetic lubricants. One subtype of polyethylene is a high density polyethylene (HDPE).

A particularly valuable subtype of poly(ethylene alpha-olefin) copolymer is a poly(ethylene alpha-olefin) block copolymer or, simply, an olefin block copolymer (OBC). OBCs are characterized as having at least one so-called "hard segment" or block comprising residuals of ethylene monomer and at least one so-called "soft segment" or block comprising residuals of an alpha-olefin (also known as an alpha-olefin and 1-olefin) monomer. OBCs are available from The Dow Chemical Company, Midland, Mich., USA under the trade name INFUSE™ Olefin Block Copolymers. INFUSE™ Olefin Block Copolymers are useful in a variety of forms and applications such as, for example, those listed at www.dow.com/infuse. Part of a preparation of an OBC involves a process that, among other steps, selectively polymerizes ethylene in the presence of the alpha-olefin to form the one or more hard segments of the OBC.

U.S. Pat. No. 6,114,481 mentions a method of and catalyst system for polymerizing olefins to prepare olefin-derived copolymers. The catalyst system contains an organometallic complex of a Group 4 metal and an activator. The organometallic complex contains a ketimide ligand (i.e., (Sub 1)(Sub 2)C=N—).

Adams N., et al., *Discovery and evaluation of highly active imidotitanium ethylene polymerization catalysts using high throughput catalyst screening*, Chemical Communications, 2004: 434-435, mention a method of and catalyst system for polymerizing ethylene to prepare polyethylenes. The catalyst system contains an organometallic complex of the Group 4 metal titanium and an activator. Some of the organometallic complexes contain a single ketimide ligand (i.e., $(R)_2C=N-$).

PCT International Patent Application Publication Number WO 2005/123790 A1 mentions a method of and catalyst system for polymerizing olefins to prepare olefin-derived copolymers. The catalyst system contains a catalyst covalently bonded to an activator.

Chemical industry desires new processes and catalysts for selectively polymerizing ethylene in the presence of an alpha-olefin.

BRIEF SUMMARY OF THE INVENTION

In a first embodiment, the present invention is a process for selectively polymerizing ethylene (also known as ethene, i.e., $H_2C=CH_2$) in the presence of an alpha-olefin, the process comprising a step of contacting together a catalytic amount of a catalyst comprising a mixture or reaction product of ingredients (a) and (b), ethylene as ingredient (c), and an alpha-olefin as ingredient (d), ingredients (a) and (b) being:

ingredient (a) being one or more metal-ligand complexes (also referred to herein as precatalysts) of formula (I):

(I)

wherein:

X is a neutral monodentate ligand comprising a $(C_1-C_{40})$ heterohydrocarbon having 1 donor heteroatom or a polydentate ligand comprising a $(C_1-C_{40})$heterohydrocarbon and having 2, 3, or 4 donor heteroatoms, each donor heteroatom independently being oxygen, nitrogen, sulfur, phosphorous, or arsenic;

M is a metal of any one of Groups 3 to 9 of a Periodic Table of the Elements, the metal being in a formal oxidation state of +2, +3, +4, +5, or +6;

Y is absent or is a neutral ligand that is $R^MN(R^K)R^L$, $R^KOR^L$, $R^KSR^L$, or $R^MP(R^K)R^L$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above; or X and Y are taken together to form a radical $X^R-Y^R$, the $X^R$ and $Y^R$ each being bonded to M in formula (I), $X^R$ being a neutral monodentate or polydentate ligand radical derived from the $(C_1-C_{40})$heterohydrocarbon of X and $Y^R$ being a neutral ligand radical derived from the $R^MN(R^K)R^L$, $R^KOR^L$, $R^KSR^L$, or $R^MP(R^K)R^L$ of Y;

$R^1$ is a radical group that is a hydrogen atom, $(C_1-C_{40})$hydrocarbyl, $(C_1-C_{40})$heterohydrocarbyl, halo, $R^KR^LN-$, $R^LO-$, $R^LS-$, $R^LSe-$, $R^KR^LP-$, or $R^KR^LR^MSi-$, wherein each $R^K$, $R^L$, and $R^M$ independently is as defined above; or $R^1$ is taken together with X or Y to form a respective monoradical $X^R-R^{11}$ or $Y^R-R^{11}$, the monoradical being part of $R^{11}$, the $R^{11}$ being bonded via the monoradical to the nitrogen atom in formula (I) and the $X^R$ or $Y^R$, respectively, being bonded to the M in formula (I); or $R^1$, X, and Y are taken together to form a monoradical group $X^R-Y^{Ra}-R^{11}$ or $X^R$—$R^{12}$—$Y^R$, each $X^R$ and $Y^R$ being as defined above, and the monoradical of $X^R$—$Y^{Ra}$—$R^{11}$ or $X^R$—$R^{12}$—$Y^R$ is part of $R^{11}$ or $R^{12}$, respectively, $R^{11}$ and $R^{12}$ independently being a $(C_1-C_{40})$hydrocarbylene or $(C_1-C_{40})$heterohydrocarbylene, where for each of $X^R$—$Y^{Ra}$—$R^{11}$ and $X^R$—$R^{12}$—$Y^R$, $X^R$ and $Y^{Ra}$ or $Y^R$, respectively, are bonded to the M in formula (I) and $R^{11}$ or $R^{12}$, respectively, is bonded via the monoradical thereof to the nitrogen atom in formula (I);

Each of $L^1$ and $L^2$ independently is anionic ligand, the anionic ligand independently having a net formal oxidation state of −1 or −2 and independently being hydride, $(C_1-C_{40})$hydrocarbyl carbanion, $(C_1-C_{40})$heterohydrocarbyl carbanion, halide, nitrate, carbonate, phosphate, sulfate, $HC(O)O^-$, $(C_1-C_{40})$hydrocarbyl$C(O)O^-$, oxalate (i.e., $^-O_2CC(O)O^-$), $HC(O)N(H)^-$, $(C_1-C_{40})$hydrocarbyl$C(O)N(H)^-$, $(C_1-C_{40})$hydrocarbyl$C(O)N((C_1-C_{20})$hydrocarbyl$)^-$, $R^K R^L B^-$, $R^K R^L N^-$, $R^K O^-$, $R^K S^-$, $R^K R^L P^-$, $R^M R^K R^L Si^-$, or 1,3-dionate of formula (D): $R^E$—$C(O^-)$=$C$—$C(=O)$—$R^E$ (D), wherein each $R^D$ independently is H, unsubstituted $(C_1-C_6)$alkyl, phenyl, or naphthyl and each $R^K$, $R^L$, and $R^M$ independently is as defined above; or $L^1$ and $L^2$ are taken together to form a tautomer of a 1,3-diene of formula (E): $(R^E)_2 C$=$C(R^E)$—$C(R^E)$=$C(R^E)_2$ (E), wherein each $R^E$ independently is H, unsubstituted $(C_1-C_6)$alkyl, phenyl, or naphthyl; or $L^1$ and $L^2$ are taken together to form a dianionic ligand having a net oxidation state of −2 and independently being $(C_2-C_{40})$hydrocarbylene dicarbanion, $(C_1-C_{40})$heterohydrocarbylene dicarbanion, oxalate, phosphate, or sulfate; where $L^1$ and $L^2$ are selected depending on the formal oxidation state of M such that the metal-ligand complex of formula (I) is, in aggregate, neutral;

Each of the aforementioned $(C_1-C_6)$alkyl, $(C_1-C_{40})$heterohydrocarbon, $(C_1-C_{20})$hydrocarbyl, $(C_1-C_{40})$hydrocarbyl, $(C_1-C_{40})$heterohydrocarbyl, $(C_2-C_{40})$hydrocarbylene, and $(C_1-C_{40})$heterohydrocarbylene are the same or different and independently is unsubstituted or substituted with one or more substituents $R^S$; and Each $R^S$ independently is halo, polyfluoro, perfluoro, unsubstituted $(C_1-C_{18})$hydrocarbyl, $F_3C$—, $FCH_2O$—, $F_2HCO$—, $F_3CO$—, oxo (i.e., =O), $R_3Si$—, $RO$—, $RS$—, $RS(O)$—, $RS(O)_2$—, $R_2P$—, $R_2N$—, $R_2C$=$N$—, $NC$—, $RC(O)O$—, $ROC(O)$—, $RC(O)N(R)$—, or $R_2NC(O)$—, wherein each R independently is an unsubstituted $(C_1-C_{18})$hydrocarbyl; and ingredient (b) being one or more activating co-catalysts, or a reaction product thereof, wherein the ratio of total number of moles of the one or more metal-ligand complexes of formula (I) to total number of moles of the one or more activating co-catalysts is from 1:10,000 to 100:1; wherein the contacting step is performed under olefin polymerizing conditions (described later) and prepares a rich polyethylene in contact with unpolymerized $(C_3-C_{40})$alpha-olefin, the rich polyethylene being characterizable as having less than 5 mole percent (mol %) of a residual of the $(C_3-C_{40})$ alpha-olefin covalently incorporated therein as determined by nuclear magnetic resonance (NMR) spectroscopy (described later) and the olefin polymerizing conditions being characterizable by a reaction rate constant $k_{11}$ for adding the ethylene monomer to a reactive chain end comprising an ethylene residual; a reaction rate constant $k_{12}$ for adding the $(C_3-C_{40})$alpha-olefin comonomer to a reactive chain end comprising the ethylene residual; and a reactivity ratio $r_1$ equal to $k_{11}$ divided by $k_{12}$ of greater than 10 (i.e., $r_1$=$k_{11}/k_{12}$>10).

In a second embodiment, the present invention provides a continuous process for selectively polymerizing ethylene in the presence of an alpha-olefin and preparing a poly(ethylene alpha-olefin) block copolymer, the process comprising a step of contacting together a catalytic amount of a catalyst comprising a mixture or reaction product of the ingredients (a) and (b); ingredients (c), and (d); a chain shuttling agent (CSA) as ingredient (e); and a promiscuous olefin polymerization catalyst useful for copolymerizing ethylene and the $(C_3-C_{40})$ alpha-olefin, the promiscuous olefin polymerization catalyst being ingredient (f); wherein ingredients (a), (b), (c), and (d) are as described above for the first embodiment;

the chain shuttling agent (ingredient (e)) is a molecule characterizable, without limitation, as functioning in the process of the second embodiment in such a way that polymer chains are transferred between the catalyst comprising a mixture or reaction product of ingredients (a) and (b) and the promiscuous olefin polymerization catalyst; and the promiscuous olefin polymerization catalyst (ingredient (f)) is characterizable as having a comonomer incorporation index of 15 mole percent of comonomer or higher;

wherein the contacting step comprises a continuous polymerization process that is performed under olefin polymerizing conditions and prepares a poly(ethylene alpha-olefin) block copolymer in one polymerization reactor, the poly (ethylene alpha-olefin) block copolymer comprising a rich polyethylene in a form of a polyethylene hard segment (i.e., an ethylene-derived (i.e., residuals of ethylene) hard segment) and a soft segment comprising residuals from the $(C_3-C_{40})$alpha-olefin and ethylene, the polyethylene hard segment being covalently bonded to the soft segment, and the polyethylene hard segment being characterizable as having less than 5 mole percent (mol %) of a residual of the $(C_3-C_{40})$alpha-olefin covalently incorporated therein as determined by NMR spectroscopy and the olefin polymerizing conditions being characterizable by the aforementioned reactivity ratio $r_1$ equal to $k_{11}$ divided by $k_{12}$ of greater than 10.

The metal-ligand complex(es) of formula (I) and catalyst(s) derived therefrom with the one or more activating co-catalysts are useful in the processes of the first and second embodiments. The process of the first embodiment selectively gives the rich polyethylene (e.g., a high density polyethylene) in the presence of the $(C_3-C_{40})$alpha-olefin. The process of the second embodiment gives the polyethylene hard segment of the poly(ethylene alpha-olefin) block copolymer in the presence of the $(C_3-C_{40})$alpha-olefin.

Preferably, the invention processes are characterizable as being capable of polymerizing ethylene in the presence of a polymerizable higher olefin such as the $(C_3-C_{40})$alpha-olefin to form the rich polyethylene, which can then be separated, if desired, from remaining polymerizable higher olefin by conventional means (e.g., filtering/washing the rich polyethylene-containing material or stripping or evaporating of the higher polymerizable olefin). The processes of the present invention work with any mole ratio of moles of $(C_3-C_{40})$ alpha-olefin to moles of ethylene. An advantage of the present invention processes is that they are capable of preparing the rich polyethylene in circumstances where it would be desirable to do so in the presence of the higher polymerizable olefin. Such circumstances include, but are not limited to, use of ethylene/$(C_3-C_{40})$alpha-olefin feed mixtures to prepare high density polyethylenes and preparation of the rich polyethylene as the polyethylene hard segment of the poly(ethylene alpha-olefin) block copolymer. Another advantage is that the invention processes are capable of preparing a highly rich polyethylene having in some embodiments less than 2 mole percent of residuals from the higher polymerizable olefin incorporated therein. Still another advantage is that the invention continuous process is capable of preparing in some embodiments new poly(ethylene alpha-olefin) block copolymers. Still yet another advantage may be that in some embodiments, the new poly(ethylene alpha-olefin) block copolymers may not be preparable, or would be preparable in low yields, by a non-invention process that lacks catalysts or catalyst systems comprising the mixture or reaction product of the ingredients (a), (b), (e), and (f) as described in the second embodiment.

The term "poly(ethylene alpha-olefin) block copolymer" is used interchangeably herein with the terms "olefin block copolymer," "OBC," "ethylene/a-olefin block interpolymer," and "ethylene/α-olefin block copolymer". The terms "alpha-olefin" and "α-olefin" are used interchangeably herein.

The rich polyethylenes (e.g., a high density polyethylene) and poly(ethylene alpha-olefin) block copolymers prepared by the respective processes of the first and second embodiment are useful in numerous applications such as, for example, synthetic lubricants and, especially for the OBCs, elastic films for hygiene applications (e.g., for diaper covers); flexible molded goods for appliances, tools, consumer goods (e.g., toothbrush handles), sporting goods, building and construction components, automotive parts, and medical applications (e.g., medical devices); flexible gaskets and profiles for appliance (e.g., refrigerator door gaskets and profiles), building and construction, and automotive applications; adhesives for packaging (e.g., for use in manufacturing corrugated cardboard boxes), hygiene applications, tapes, and labels; and foams for sporting goods (e.g., foam mats), packaging, consumer goods, and automotive applications.

Additional embodiments are described in the remainder of the specification, including the claims.

DETAILED DESCRIPTION OF THE INVENTION

Preferably for the invention process of the first or second embodiment, the reactivity ratio $r_1$ is greater than 20, more preferably greater than 30, still more preferably greater than 50, and even more preferably greater than 100. When the reactivity ratio $r_1$ for the invention processes approaches infinity, incorporation of the $(C_3-C_{40})$alpha-olefin into the rich polyethylene produced thereby approaches 0 mol %. In some embodiments, the rich polyethylene, preferably the polyethylene hard segment of the poly(ethylene alpha-olefin) block copolymer, is characterized as having 4 mol % or less, more preferably less than 2 mol %, and still more preferably 1.8 mol % or less of the residual of the $(C_3-C_{40})$alpha-olefin covalently incorporated in the rich polyethylene or polyethylene hard segment of the poly(ethylene alpha-olefin) block copolymer. In some embodiments, the rich polyethylene, preferably the polyethylene hard segment of the poly(ethylene alpha-olefin) block copolymer is characterized as having at least 0.01 mol %, in other embodiments at least 0.1 mol %, and in still other embodiments at least 1.0 mol % of the residual of the $(C_3-C_{40})$alpha-olefin covalently incorporated in the rich polyethylene or polyethylene hard segment of the poly(ethylene alpha-olefin) block copolymer. Said mol % are preferably determined by nuclear magnetic resonance spectroscopy as described later. Preferably, the residuals of the $(C_3-C_{40})$alpha-olefin and ethylene are approximately randomly distributed in the soft segment of the poly(ethylene alpha-olefin) block copolymer.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Summary or Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

Certain unsubstituted chemical groups are described herein as having a maximum number of 40 carbon atoms (e.g., $(C_1-C_{40})$hydrocarbyl and $(C_1-C_{40})$heterohydrocarbyl). These include substituent groups (e.g., R groups) and olefin monomers where number of carbon atoms is not critical. Forty carbon atoms in such unsubstituted chemical groups is a practical upper limit; nevertheless in some embodiments the invention contemplates such unsubstituted chemical groups having a maximum number of carbon atoms that is higher than 40 (e.g., 100, 1000, or more).

The word "optionally" means "with or without." For example, "optionally, an additive" means with or without an additive.

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," meaning of "about" can be construed from context of its use. Preferably "about" means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "plurality" means two or more, wherein each plurality is independently selected unless indicated otherwise. The terms "first," "second," et cetera serve as a convenient means of distinguishing between two or more elements or limitations (e.g., a first chair and a second chair) and do not imply quantity or order unless specifically so indicated. The symbols "≦" and "≧" respectively mean less than or equal to and greater than or equal to. The symbols "<" and ">" respectively mean less than and greater than.

Any headings herein are used only for convenience of the reader and do not limit, and should not be interpreted as limiting, the present invention.

Where the invention, or a portion or preferred embodiment thereof, is defined in the alternative by one or more Markush groups, wherein each Markush group independently consists of its own members (e.g., for illustration purposes a general Markush group "A" consisting of members A1, A2, and A3; or Markush group "A3" consisting of preferred members A3a, A3b, A3c, and A3d), the invention contemplates preferred embodiments that (i) select any single member from one of the one or more Markush groups (e.g., for illustration purposes selecting A2 from Markush group A or selecting A3c from Markush group A3), thereby limiting scope of the one Markush group (e.g., A or A3) to the selected single member (e.g., A2 or A3c); or (ii) delete any single member from one of the one or more Markush groups (e.g., for illustration purposes deleting A1 from Markush group A or deleting A3a from Markush group A3), thereby limiting the one Markush group (e.g., A or A3) to the remaining members thereof (e.g., to A2 and A3 remaining in Markush group A or to A3b, A3c, and A3d remaining in Markush group A3). In some embodiments the member that is selected or deleted is chosen from any one of the members of the one Markush group that is illustrated in one of the Examples or other species of the present invention described herein.

Unless otherwise noted, the phrase "Periodic Table of the Elements" refers to the official periodic table, version dated Jun. 22, 2007, published by the International Union of Pure and Applied Chemistry (IUPAC). Also any references to a Group or Groups shall be to the Group or Groups reflected in this Periodic Table of the Elements.

In a third embodiment, the present invention is the metal-ligand complex of formula (I):

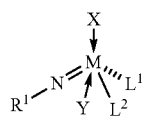

wherein either:

X is a neutral monodentate ligand containing from 1 to 40 carbon atoms and 1 donor heteroatom, the donor heteroatom independently being oxygen, nitrogen, sulfur, phosphorous, or arsenic; and M, Y, $R^1$, $L^1$, and $L^2$ are as previously defined in the first embodiment; or X is a neutral polydentate ligand containing from 1 to 40 carbon atoms and 2, 3, or 4 donor heteroatoms, respectively, each donor heteroatom independently being oxygen, sulfur, phosphorous, or arsenic; and M, Y, $R^1$, $L^1$, and $L^2$ are as previously defined in the first embodiment; or Y is the neutral ligand; or M is zirconium, hafnium, or a metal of any one of Groups 3, 5, 6 or Groups 7 to 9 of a Periodic Table of the Elements (described later), the metal being in a formal oxidation state of +2, +3, +4, +5, or +6; and X, Y, $R^1$, $L^1$, and $L^2$ are as previously defined in the first embodiment; or Each of $L^1$ and $L^2$ independently is the anionic ligand, the anionic ligand independently having a net oxidation state of −1 or −2 and independently being hydride, $(C_1$-$C_{40})$hydrocarbyl carbanion, $(C_1$-$C_{40})$heterohydrocarbyl carbanion, nitrate, carbonate, phosphate, sulfate, HC(O)O⁻, $(C_1$-$C_{40})$hydrocarbylC(O)O⁻, oxalate, HC(O)N(H)⁻, $(C_1$-$C_{40})$hydrocarbylC(O)N(H)⁻, $(C_1$-$C_{40})$hydrocarbylC(O)N((C_1$-$C_{20})$hydrocarbyl)⁻, $R^K R^L B^-$, $R^K R^L N^-$, $R^K O^-$, $R^K S^-$, $R^K R^L P^-$, $R^M R^K R^L Si^-$, or 1,3-dionate of formula (D): $R^E$—C(O⁻)=C—C(=O)—$R^E$ (D), wherein each $R^D$ independently is H, unsubstituted $(C_1$-$C_6)$alkyl, phenyl, or naphthyl and each $R^K$, $R^L$, and $R^M$ independently is as defined in the first embodiment, or $L^1$ and $L^2$ are taken together to form a tautomer of a 1,3-diene of formula (E): $(R^E)_2C$=C($R^E$)—C($R^E$)=C($R^E)_2$ (E), wherein each $R^E$ independently is H, unsubstituted $(C_1$-$C_6)$alkyl, phenyl, or naphthyl, or $L^1$ and $L^2$ are taken together to form a dianionic ligand having a net formal oxidation state of −2 and independently being $(C_2$-$C_{40})$hydrocarbylene dicarbanion, $(C_1$-$C_{40})$heterohydrocarbylene dicarbanion, oxalate, phosphate, or sulfate; where $L^1$ and $L^2$ are selected depending on the formal oxidation state of M such that the metal-ligand complex of formula (I) is, in aggregate, neutral, and X, Y, M, and $R^1$ are as previously defined in the first embodiment; or $R^1$ is a radical group that is a hydrogen atom, halo, $O_2N$—, $R^K R^L N$—, $R^L S$—, $R^L Se$—, $R^K R^L P$—, or $R^K R^L R^M Si$—, wherein each $R^K$, $R^L$, and $R^M$ independently is hydrogen, $(C_1$-$C_{40})$hydrocarbyl, or $(C_1$-$C_{40})$heterohydrocarbyl, or $R^K$ and $R^L$ are taken together to form a $(C_2$-$C_{40})$hydrocarbylene or $(C_1$-$C_{40})$heterohydrocarbylene; and X, Y, M, $L^1$, $L^2$, and the immediately foregoing $R^1$ groups are as previously defined in the first embodiment.

The term "donor heteroatom" means a unit of an element capable of donating a pair of electrons. The term "neutral ligand" means a compound comprising a Lewis base functionality, the Lewis base functionality being bonded to M via a dative bond, which is also known as a coordinate valence or a coordinate bond.

In a fourth embodiment, the present invention is a catalyst comprising a mixture or reaction product of the one or more metal-ligand complexes of formula (I) of the third embodiment and one or more activating co-catalysts, wherein the ratio of total number of moles of the one or more metal-ligand complexes of formula (I) of the third embodiment to total number of moles of the one or more activating co-catalysts is from 1:10,000 to 100:1. In some embodiments, the catalyst of the fourth embodiment further comprises the chain shuttling agent and promiscuous olefin polymerization catalyst described in the second embodiment.

A particularly preferred metal-ligand complex of formula (I) is one capable of being used to prepare such catalyst(s) that can achieve a high selectivity for polymerizing ethylene in the presence of the $(C_3$-$C_{40})$alpha-olefin in the process of the first or second embodiment, wherein the high selectivity is characterized by the reactivity ratio $r_1$ or ratio $r_1/r_2$ described previously.

In another embodiment, the present invention is a process for polymerizing ethylene in the absence of a polymerizable higher olefin, the process comprising a step of contacting together ingredients comprising ingredients (a), (b), and (c), wherein ingredients (b) and (c) are as described previously for ingredients (b) and (c), respectively, in the first embodiment and wherein ingredient (a) is the metal-ligand complex of formula (I) of the third embodiment, wherein the contacting step is performed under olefin polymerizing conditions (as described later for the first embodiment) and prepares a high density polyethylene. The term "high density polyethylene" means a polymer having residuals of ethylene and a density of greater than or equal to 0.941 grams per milliliter (g/mL).

Preferably, the invention processes employ three or fewer, more preferably two, and still more preferably one metal-ligand complex of formula (I). Also preferably, the invention processes employ the one or more metal-ligand complexes of formula (I) (ingredient (a)) and the one or more activating co-catalysts (ingredient (b)) that comprise or derive a catalyst, wherein the catalyst is characterized as having a catalyst efficiency of greater than 1,300,000, and more preferably greater than 2,000,000, wherein the catalyst efficiency is calculated by dividing the number of grams of rich polyethylene prepared by the number of grams of ingredient (a) (i.e., metal complex of formula (I)) employed (i.e., catalyst efficiency=g HDPE prepared/g metal-ligand complex of formula (I) employed).

The metal-ligand complexes of formula (I) are rendered catalytically active by contacting them to, or combining them with, the activating co-catalyst or by using an activating technique such as those that are known in the art for use with metal (e.g., Group 4) olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis (explained in more detail hereinafter). Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, United States Patent Number (USPN) U.S. Pat. No. 6,103,657. Examples of preferred polymeric or oligomeric alumoxanes are methylalumoxane, triisobutylaluminum-modified methylalumoxane, and isobutylalumoxane.

Preferred Lewis acid activating co-catalysts are Group 13 metal compounds containing from 1 to 3 hydrocarbyl substituents as described herein. More preferred Group 13 metal compounds are tri(hydrocarbyl)-substituted-aluminum or tri(hydrocarbyl)-boron compounds, still more preferred are tri($C_1$-$C_{10}$)alkyl)aluminum or tri(($C_6$-$C_{18}$)aryl)boron compounds and halogenated (including perhalogenated) derivatives thereof, even more especially tris(fluoro-substituted phenyl)boranes, still more especially tris(pentafluorophenyl)borane. In some embodiments, the activating co-catalyst is a tris(($C_1$-$C_{20}$)hydrocarbyl) borate (e.g., trityl tetrafluoroborate) or a tri(($C_1$-$C_{20}$)hydrocarbyl)ammonium tetra(($C_1$-$C_{20}$)hydrocarbyl)borane (e.g., bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Preferred combinations of neutral Lewis acid activating co-catalysts include mixtures comprising a combination of a tri(($C_1$-$C_4$)alkyl)aluminum and a halogenated tri(($C_6$-$C_{18}$)aryl)boron compound, especially a tris(pentafluorophenyl)borane. Also preferred are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Preferred ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, more preferably from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. Preferably, the ratio is at least 1:5000, more preferably at least 1:1000; and 10:1 or less, more preferably 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, preferably the number of moles of the tris(pentafluorophenyl)borane that are employed to the total number of moles of one or more metal-ligand complexes of formula (I) form 0.5:1 to 10:1, more preferably from 1:1 to 6:1, still more preferably from 1:1 to 5:1. The remaining activating co-catalysts are generally employed in approximately mole quantities equal to the total mole quantities of one or more metal-ligand complexes of formula (I).

In some embodiments, polymerizable olefins useful in the invention processes are ($C_2$-$C_{40}$)hydrocarbons consisting of carbon and hydrogen atoms and containing at least 1 and preferably no more than 3, and more preferably no more than 2 carbon-carbon double bonds. In some embodiments, from 1 to 4 hydrogen atoms of the ($C_2$-$C_{40}$)hydrocarbons are replaced, each by a halogen atom, preferably fluoro or chloro to give halo-substituted ($C_2$-$C_{40}$)hydrocarbons. The ($C_2$-$C_{40}$) hydrocarbons (not halo-substituted) are preferred. Preferred polymerizable olefins (i.e., olefin monomers) useful for making the polyolefins are ethylene and polymerizable ($C_3$-$C_{40}$) olefins. The ($C_3$-$C_{40}$)olefins include an alpha-olefin, a cyclic olefin, styrene, and a cyclic or acyclic diene. Preferably, the alpha-olefin comprises the ($C_3$-$C_{40}$)alpha-olefin, more preferably a branched chain ($C_3$-$C_{40}$)alpha-olefin, still more preferably a linear-chain ($C_3$-$C_{40}$)alpha-olefin, even more preferably a linear chain ($C_3$-$C_{40}$)alpha-olefin of formula (A): $CH_2=CH_2-(CH_2)_zCH_3$ (A), wherein z is an integer of from 0 to 40, and yet even more preferably a linear-chain ($C_3$-$C_{40}$)

alpha-olefin that is 1-propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, or a linear-chain ($C_{20}$-$C_{24}$)alpha-olefin. Preferably the cyclic olefin is a ($C_3$-$C_{40}$)cyclic olefin. Preferably, the cyclic or acyclic diene is a ($C_4$-$C_{40}$)diene, preferably an acyclic diene, more preferably an acyclic conjugated ($C_4$-$C_{40}$)diene, more preferably an acyclic 1,3-conjugated ($C_4$-$C_{40}$)diene, and still more preferably 1,3-butadiene.

Polyolefins that can be made by an invention process include, for example, rich polyethylene and interpolymers that comprise residuals of ethylene and one or more polymerizable ($C_3$-$C_{40}$)olefins. Preferred homopolymers are high density polyethylene. Preferred interpolymers are those prepared by co-polymerizing a mixture of two or more polymerizable olefins such as, for example, ethylene/propylene, ethylene/1-butene, ethylene/1-pentene, ethylene/1-hexene, ethylene/4-methyl-1-pentene, ethylene/1-octene, ethylene/styrene, ethylene/propylene/butadiene and other EPDM terpolymers. Preferably, the polyolefin is an ethylene homopolymer (e.g., a high density polyethylene), an ethylene/alpha-olefin interpolymer (i.e., poly(ethylene alpha-olefin) copolymer such as, for example, a poly(ethylene 1-octene)), or an ethylene/alpha-olefin/diene interpolymer (i.e., a poly(ethylene alpha-olefin diene) terpolymer such as, for example, a poly(ethylene 1-octene 1,3-butadiene).

Preferably in the invention processes, the mole ratio of (moles of ($C_3$-$C_{40}$)alpha-olefin)/(moles of ethylene) is 0.1 or higher, more preferably 0.30 or higher, still more preferably 0.50 or higher, and even more preferably 0.75 or higher (e.g., 1.0 or higher).

In a fifth embodiment, the present invention is a polyolefin, preferably a rich polyethylene, more preferably a high density polyethylene (e.g., as part of an intermediate mixture in contact with the alpha-olefin) prepared by the process of the first embodiment, and still more preferably the present invention is the aforementioned poly(ethylene alpha-olefin) block copolymer prepared according to the process of the second embodiment.

Preferably, the poly(ethylene alpha-olefin) block copolymer is characterizable as having a melting temperature of greater than 100 degrees Celsius, and more preferably greater than 120° C., as determined by Differential Scanning Calorimetry using the procedure described later.

The poly(ethylene alpha-olefin) block copolymers comprise ethylene residuals and one or more copolymerizable α-olefin comonomer residuals (i.e., ethylene and one or more copolymerizable α-olefin comonomers in polymerized form). The poly(ethylene alpha-olefin) block copolymers are characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

(AB)n where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

"Hard" segments refer to blocks of polymerized units in which ethylene residuals are present in an amount greater than 95 weight percent, and preferably greater than 98 weight percent in the poly(ethylene alpha-olefin) block copolymers. In other words, the comonomer (e.g., ($C_3$-$C_{40}$)alpha-olefin) residuals content in the hard segments is less than 5 weight percent, and preferably less than 2 weight percent. In some embodiments, the hard segments comprise all or substantially all ethylene residuals. The phrases "polyethylene hard segment" and "ethylene-derived hard segment" are synonymous and mean the hard segment portion of a poly(ethylene alpha-olefin) block copolymer.

"Soft" segments refer to blocks of polymerized units in which the comonomer residuals content is greater than 5 weight percent, preferably greater than 8 weight percent, greater than 10 weight percent, or greater than 15 weight percent in the poly(ethylene alpha-olefin) block copolymers. In some embodiments, the comonomer residuals content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along a polymer (backbone) chain of the poly (ethylene alpha-olefin) block copolymer. In other words, the poly(ethylene alpha-olefin) block copolymers usually do not have a structure like:

AAA-AA-BBB-BB.

In other embodiments, the poly(ethylene alpha-olefin) block copolymers usually do not have a third type of block, i.e., do not have a "C" block that is not an A block and not a B block. In still other embodiments, each of block A and block B of the poly(ethylene alpha-olefin) block copolymers has monomers or comonomers randomly distributed within the block. In other words, neither block A nor block B comprises two or more segments (or sub-blocks) of distinct composition, such as a tip segment, which has a different composition than the rest of the block.

In some embodiments, the polyolefin comprises an ethylene/alpha-olefin interpolymer, such as those described in PCT International Patent Application Publication Number WO 2009/097560, which is herein incorporated by reference, preferably a block copolymer, which comprises a hard segment and a soft segment, and is characterized by a $M_w/M_n$ in the range of from about 1.4 to about 2.8 and:

(a) has at least one $T_m$ (° C.), and a density (d) in grams/cubic centimeter, wherein the numerical values of $T_m$ and d correspond to the relationship:

$$T_m > -6553.3 + 13735(d) - 7051.7(d)^2, \text{ or}$$

(b) is characterized by a heat of fusion (ΔH, in J/g), and a delta temperature quantity (ΔT, in ° C.), defined as the temperature difference between the tallest differential scanning calorimetry (DSC) peak and the tallest crystallization analysis fractionation (CRYSTAF) peak, wherein the numerical values of ΔT and ΔH have the following relationships:

ΔT > -0.1299(ΔH) + 62.81 for ΔH greater than zero (0) and up to 130 J/g,

ΔT ≥ 48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery ($R_e$) in percent at 300 percent strain and 1 cycle measured with a compression-molded film of the ethylene/alpha-olefin interpolymer, and has a density d in grams/cubic centimeter, wherein the numerical values of $R_e$ and d satisfy the following relationship when ethylene/alpha-olefin interpolymer is substantially free of a cross-linked phase:

$$R_e > 1481 - 1629(d);\text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/alpha-olefin interpolymer; or (e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1; or (f) is characterized by an average block index greater than zero (0) and up to about 1.0; or (g) has a molecular fraction which elutes between 40° C. and 130° C. when fractionated using TREF, characterized in that the fraction has a molar comonomer content greater than, or equal to, the quantity $(-0.2013)T + 20.07$, more preferably greater than or equal to the quantity $(-0.2013)T + 21.07$, where T is the numerical value of the peak elution temperature of the TREF fraction, measured in ° C.; and, wherein the ethylene/alpha-olefin block interpolymer is mesophase separated.

In some embodiments, the polyolefin comprises an ethylene/alpha-olefin interpolymer, such as that described in U.S. Pat. No. 7,355,089 and U.S. Patent Application Publication No. US 2006-0199930, wherein the interpolymer is preferably a block copolymer, and comprises a hard segment and a soft segment, and the ethylene/alpha-olefin interpolymer:

(a) has a $M_w/M_n$ from about 1.7 to about 3.5, at least one $T_m$ (° C.), and a density d, in grams/cubic centimeter, wherein the numerical values of $T_m$ and d correspond to the relationship:

$$Tm > -2002.9 + 4538.5(d) - 2422.2(d)2;\text{ or}$$

(b) has a $M_w/M_n$ from about 1.7 to about 3.5, and is characterized by a heat of fusion, $\Delta H$ in J/g, and a delta quantity, $\Delta T$ (° C.), defined as the temperature difference between the tallest DSC peak and the tallest CRYSTAF peak, wherein the numerical values of $\Delta T$ and $\Delta H$ have the following relationships:

$$\Delta T > -0.1299(\Delta H) + 62.81 \text{ for } \Delta H \text{ greater than zero and up to 130 J/g,}$$

$$\Delta T \geq 48°\text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an $R_e$ in percent at 300 percent strain and 1 cycle measured with a compression-molded film of the ethylene/alpha-olefin interpolymer, and has a density, d, in grams/cubic centimeter, wherein the numerical values of $R_e$ and d satisfy the following relationship when ethylene/alpha-olefin interpolymer is substantially free of a cross-linked phase:

$$R_e > 1481 - 1629(d);\text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/alpha-olefin interpolymer; or (e) has a storage modulus at 25° C. (G'(25° C.)), and a storage modulus at 100° C., (G'(100° C.)), wherein the ratio of G'(25° C.) to G'(100° C.) is in the range of about 1:1 to about 9:1 or (f) has a molecular fraction which elutes between 40° C. and 130° C. when fractionated using TREF, characterized in that the fraction has a block index of at least 0.5 and up to about 1 and a $M_w/M_n$ greater than about 1.3; or (g) has an average block index greater than zero (0) and up to about 1.0 and a $M_w/M_n$ greater than about 1.3; or (h) has a molecular fraction which elutes between 40° C. and 130° C. when fractionated using TREF, characterized in that the fraction has a molar comonomer content greater than, or equal to, the quantity $(-0.2013)T + 20.07$, more preferably greater than or equal to the quantity $(-0.2013)T + 21.07$, where T is the numerical value of the peak elution temperature of the TREF fraction, measured in ° C.

Other embodiments comprise polymers and processes such as those described in PCT International Patent Application Publication Nos. WO 2005/090425, WO 2005/090426, and WO 2005/090427.

Monomer and comonomer content of the polyolefins may be measured using any suitable technique such as, for example, infrared (IR) spectroscopy and nuclear magnetic resonance (NMR) spectroscopy, with techniques based on NMR spectroscopy being preferred and carbon-13 NMR spectroscopy being more preferred. Using carbon-13 NMR spectroscopy, prepare an analysis sample from a polymer sample of the high density polyethylene or poly(ethylene alpha-olefin) block copolymer by adding approximately 3 g of a 50/50 mixture of tetrachloroethane-$d^2$/orthodichlorobenzene to 0.4 g of the polymer sample in a 10 millimeter (mm) NMR tube. Dissolve and homogenize the polymer sample by heating the tube and its contents to 150° C. Collect carbon-13 NMR spectroscopy data using a JEOL Eclipse™ 400 MHz spectrometer or a Varian Unity Plus™ 400 MHz spectrometer, corresponding to a carbon-13 resonance frequency of 100.5 MHz. Acquire the carbon-13 data using 4000 transients per data file with a 6 second pulse repetition delay. To achieve minimum signal-to-noise for quantitative analysis, add multiple data files together. The spectral width is 25,000 Hz with a minimum file size of 32,000 data points. Analyze the analysis sample at 130° C. in a 10 mm broad band probe. Determine the comonomer incorporation with the carbon-13 data using Randall's triad method (Randall, J. C.; JMS-Rev. Macromol. Chem. Phys., C29, 201-317 (1989), which is incorporated by reference herein in its entirety.

In some embodiments, the amount of the $(C_3-C_{40})$alpha-olefin comonomer incorporated into the rich polyethylene or the hard and soft segments of the poly(ethylene alpha-olefin) block copolymer is characterized by a comonomer incorporation index. As used herein, the term, "comonomer incorporation index", refers to the mole percent of residuals of comonomer incorporated into an ethylene/comonomer copolymer, or ethylene-derived hard segment thereof, prepared under representative olefin polymerization conditions (described later herein), ideally under steady-state, continuous solution polymerization conditions in a hydrocarbon diluent at 100° C., 4.5 megapascals (MPa) ethylene pressure (reactor pressure), greater than 92 percent (more preferably greater than 95 percent) ethylene conversion, and greater than 0.01 percent comonomer conversion. The selection of metal complexes or catalyst compositions having the greatest difference in comonomer incorporation indices results in copolymers from two or more monomers having the largest difference in block or segment properties, such as density.

In certain circumstances the comonomer incorporation index may be determined directly, for example by the use of NMR spectroscopic techniques described previously or by IR spectroscopy. If NMR or IR spectroscopic techniques cannot be used, then any difference in comonomer incorporation is indirectly determined For polymers formed from multiple monomers this indirect determination may be accomplished by various techniques based on monomer reactivities.

For copolymers produced by a given catalyst, the relative amounts of comonomer and monomer in the copolymer and hence the copolymer composition is determined by relative rates of reaction of comonomer and monomer. Mathematically the molar ratio of comonomer to monomer is given by $$\frac{F_2}{F_1} = \left(\frac{[comonomer]}{[monomer]}\right)_{polymer} = \frac{R_{p2}}{R_{p1}} \tag{1}$$

Here $R_{p2}$ and $R_{p1}$ are the rates of polymerization of comonomer and monomer respectively and $F_2$ and $F_1$ are the mole fractions of each in the copolymer. Because $F_1+F_2=1$ we can rearrange this equation to $$F_2 = \frac{R_{p2}}{R_{p1} + R_{p2}} \tag{2}$$

The individual rates of polymerization of comonomer and monomer are typically complex functions of temperature, catalyst, and monomer/comonomer concentrations. In the limit as comonomer concentration in the reaction media drops to zero, $R_{p2}$ drops to zero, $F_2$ becomes zero and the polymer consists of pure monomer. In the limiting case of no monomer in the reactor $R_{p1}$ becomes zero and $F_2$ is one (provided the comonomer can polymerize alone).

For most homogeneous catalysts the ratio of comonomer to monomer in the reactor largely determines polymer composition as determined according to either the Terminal Copolymerization Model or the Penultimate Copolymerization Model.

For random copolymers in which the identity of the last monomer inserted dictates the rate at which subsequent monomers insert, the terminal copolymerization model is employed. In this model insertion reactions of the type

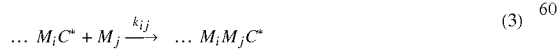

(3)

where C* represents the catalyst, $M_i$ represents monomer i, and $k_{ij}$ is the rate constant having the rate equation $$R_{P_{ij}} = k_{ij}[\ldots M_iC^*][M_j] \tag{4}$$

The comonomer mole fraction (i=2) in the reaction media is defined by the equation:

$$f_2 = \frac{[M_2]}{[M_1] + [M_2]} \tag{5}$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2f_2^2}. \tag{6}$$

From this equation the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \tag{7}$$

$$r_2 = \frac{k_{22}}{k_{21}}.$$

Alternatively, in the penultimate copolymerization model, the identities of the last two monomers inserted in the growing polymer chain dictate the rate of subsequent monomer insertion. The polymerization reactions are of the form

(8)

and the individual rate equations are:

$$R_{P_{ijk}} = k_{ijk}[\ldots M_iM_j = C^*][M_k] \tag{9}.$$

The comonomer content can be calculated (again as disclosed in George Odian, Supra.) as:

$$\frac{(1-F_2)}{F_2} = \frac{1 + \frac{r_1'X(r_1X+1)}{(r_1'X+1)}}{1 + \frac{r_2'(r_2+X)}{X(r_2'+X)}} \tag{10}$$

where X is defined as:

$$X = \frac{(1-f_2)}{f_2} \tag{11}$$

and the reactivity ratios are defined as:

$$r_1 = \frac{k_{111}}{k_{112}} \quad r_1' = \frac{k_{211}}{k_{212}} \tag{12}$$

$$r_2 = \frac{k_{222}}{k_{221}} \quad r_2' = \frac{k_{122}}{k_{121}}.$$

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp 1197-1203. Commercially available software programs may be used to assist in deriving reactivity ratios from experimentally derived data. One example of such software is *Aspen Plus from Aspen Technology*, Inc., Ten Canal Park, Cambridge, Mass. 02141-2201 USA.

In some embodiments, when preparing the poly(ethylene alpha-olefin) block copolymer according to the process of the second embodiment, the process employs a catalyst system comprising a mixture or reaction product of:

(A) a first olefin polymerization catalyst, the first olefin polymerization catalyst being characterized as having a high comonomer incorporation index (e.g., a comonomer incorporation index of 15 mole percent of comonomer or higher);

(B) a second olefin polymerization catalyst, the second olefin polymerization catalyst being characterized as having a comonomer incorporation index that is less than 90 percent of the comonomer incorporation index of the first olefin polymerization catalyst; and (C) a chain shuttling agent;

the second olefin polymerization catalyst comprising the catalyst as described in the first embodiment.

The "first olefin polymerization catalyst" is interchangeably referred to herein as "Catalyst (A)." In some embodiments, the first olefin polymerization catalyst (Catalyst (A)) means the aforementioned "promiscuous olefin polymerization catalyst." The "second olefin polymerization catalyst" is interchangeably referred to herein as "Catalyst (B)." The first and second olefin polymerization catalysts (e.g., the catalyst comprising a mixture or reaction product of ingredients (a) and (b) and the promiscuous olefin polymerization catalyst) have different ethylene and $(C_3-C_{40})$alpha-olefin selectivities.

Preferably, the catalyst that comprises a mixture or reaction product of the ingredients (a) and (b) as described in the first embodiment comprises Catalyst (B), but not Catalyst (A). Preferably, the comonomer incorporation index of Catalyst (B) is less than 50 percent and more preferably less than 5 percent of the comonomer incorporation index of Catalyst (A). Preferably, the comonomer incorporation index for Catalyst (A) is greater than 20 mol %, more preferably greater than 30 mol %, and still more preferably greater than 40 mol % incorporation of comonomer.

Preferably the Catalyst (A) of the catalyst system and the promiscuous olefin polymerization catalyst in the second embodiment independently is a Catalyst (A) described in US 2006/0199930 A1; US 2007/0167578 A1; US 2008/0311812 A1; U.S. Pat. No. 7,355,089 B2; or WO 2009/012215 A2. Also in some of such embodiments, the catalyst system further comprises another Catalyst (B) (i.e., a Catalyst (B) that is in addition to the catalyst that comprises a mixture or reaction product of the ingredients (a) and (b) as described in the first embodiment), the other Catalyst (B) being a Catalyst (B) described in US 2006/0199930 A1; US 2007/0167578 A1; US 2008/0311812 A1; U.S. Pat. No. 7,355,089 B2; or WO 2009/012215 A2.

Representative Catalysts (A) and (B) of US 2006/0199930 A1; US 2007/0167578 A1; US 2008/0311812 A1; U.S. Pat. No. 7,355,089 B2; or WO 2009/012215 A2 are the catalysts of formulas (A1) to (A5), (B1), (B2), (C1) to (C3), and (D1):

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740, and having the structure:

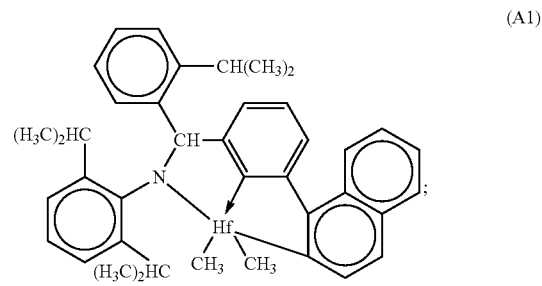

(A1)

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740, and having the structure:

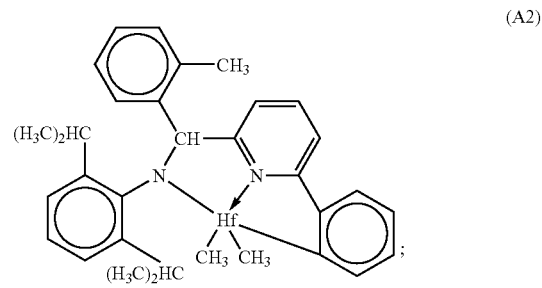

(A2)

Catalyst (A3) is bis[N,N'''-(2,4,6-tri(methylphenyl)amido) ethylenediamine]hafnium dibenzyl, and having the structure:

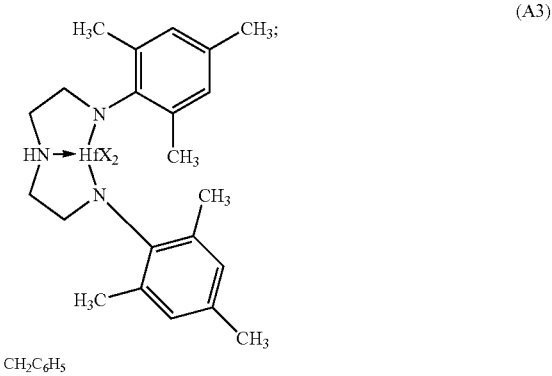

(A3)

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103, and having the structure:

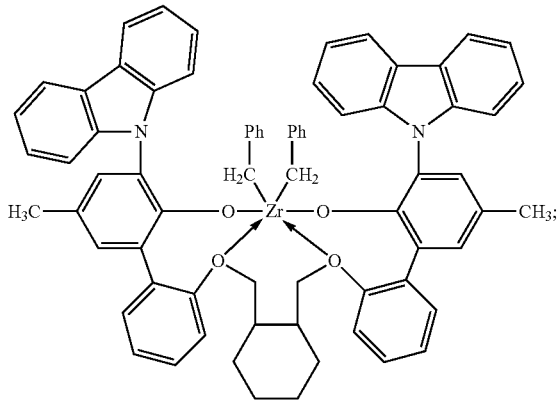

(A4)

Catalyst (A5) is [η²-2,6-diisopropyl-N-(2-methyl-3-(octylimino)butan-2-yl)benzeneamide]trimethylhafnium, prepared substantially according to the teachings of WO 2003/051935, and having the structure:

(A5)

Catalyst (B1) is 1,2-bis-(3,5-di-t-butylphenylene)(1-(N-(1-methylethyl)immino)methyl)(2-oxoyl)zirconium dibenzyl, and having the structure:

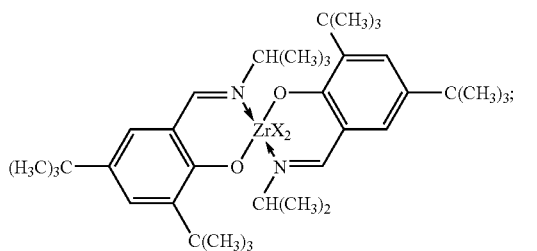

(B1)

X = CH₂C₆H₅

Catalyst (B2) is 1,2-bis-(3,5-di-t-butylphenylene)(1-(N-(2-methylcyclohexyl)-immino) methyl)(2-oxoyl)zirconium dibenzyl, prepared substantially according to the teachings of WO 2003/051935, and having the structure:

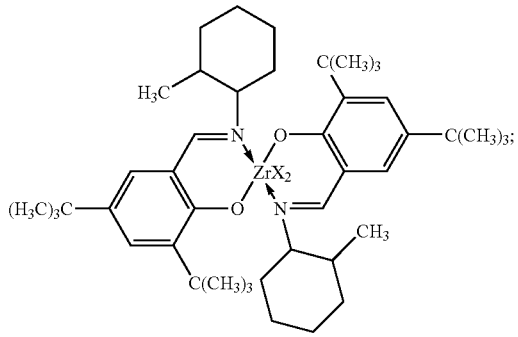

(B2)

X = CH₂C₆H₅

Catalyst (C1) is (t-butylamido)dimethyl(3-N-pyrrolyl-1,2,3,3a,7a-η-inden-1-yl)silanetitanium dimethyl, prepared substantially according to the techniques of U.S. Pat. No. 6,268,444, and having the structure:

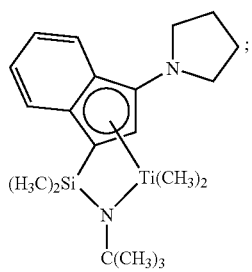

(C1)

Catalyst (C2) is (t-butylamido)di(4-methylphenyl)(2-methyl-1,2,3,3a,7a-η-inden-1-yl)silanetitanium dimethyl, prepared substantially according to the teachings of US-A-2003/004286, and having the structure:

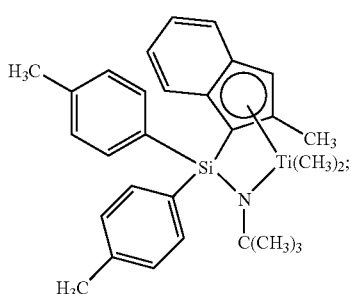

(C2)

Catalyst (C3) is (t-butylamido)di(4-methylphenyl)(2-methyl-1,2,3,3a,8a-η-s-indacen-1-yl)silanetitanium dimethyl, prepared substantially according to the teachings of US-A-2003/004286, and having the structure:

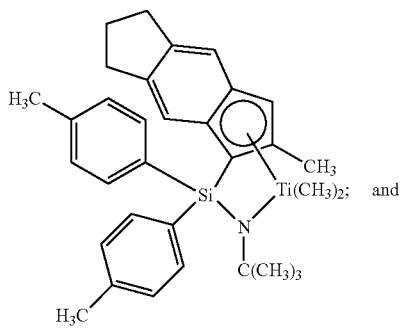

(C3)

Catalyst (D1) is bis(dimethyldisiloxane)(indene-1-yl)zirconium dichloride, available from Sigma-Aldrich, and having the structure:

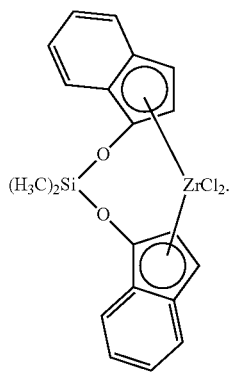

(D1)

As mentioned before, the process of the second embodiment employs and the catalyst system comprises a chain shuttling agent. As used herein, the term "chain shuttling agent" means a molecule characterizable, without limitation, as functioning in the process of the second embodiment in such a way that polymer chains are transferred between two distinct catalysts with different monomer selectivities in a single polymerization reactor. Typically, chain shuttling agents comprise a first metal that is Al, B, or Ga, the first metal being in a formal oxidation state of +3; or a second metal that is Zn or Mg, the second metal being in a formal oxidation state of +2. Preferred chain shuttling agents are described in U.S. Patent Application Publication Number US 2007/0167315. Chain shuttling agents suitable for use with the catalyst system in the process of the second embodiment include diethylzinc, di(i-butyl)zinc, di(n-hexyl) zinc, triethylaluminum, trioctylaluminum, triethylgallium, i-butylaluminum bis(dimethyl(t-butyl) siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

As mentioned before, the processes of the first and second embodiment employ olefin polymerizing conditions. In some embodiments, the olefin polymerizing conditions independently produce a catalyst in situ that is formed by reaction of the metal-ligand complex of formula (I), ingredient (b), and at least one other ingredient of the process of the first embodiment. Such other ingredients include, but are not limited to, (i) olefin monomer; (ii) another metal-ligand complex of formula (I); (iii) one or more of Catalyst (A); (iv) one or more of Catalyst (B); (v) chain shuttling agent; (vi) a catalyst stabilizer (if any); (vii) a solvent (if any); and (viii) a mixture of any two or more thereof.

Olefin polymerizing conditions independently refer to reaction conditions such as solvent(s), atmosphere(s), temperature(s), pressure(s), time(s), and the like that are preferred for giving at least a 10 percent (%), more preferably at least 20%, and still more preferably at least 30% reaction yield of the rich polyethylene from the process of the first embodiment or the polyethylene hard segment of a poly(ethylene alpha-olefin) block copolymer from the process of the second embodiment after 15 minutes reaction time. Preferably, the processes independently are run under an inert atmosphere (e.g., under an inert gas consisting essentially of, for example, nitrogen gas, argon gas, helium gas, or a mixture of any two or more thereof). Other atmospheres are contemplated, however, and these include sacrificial olefin in the form of a gas and hydrogen gas (e.g., as a polymerization termination agent). In some aspects, the process of the first or second embodiment independently is run without any solvent, i.e., is a neat process that is run in a neat mixture of ingredients (a) to (d). In other aspects, the neat mixture further contains additional ingredients (e.g., catalyst stabilizer such as triphenylphosphine) other than solvent(s). In still other aspects, the process of the first or second embodiment is run with a solvent or mixture of two or more solvents, i.e., is a solvent-based process that is run as a solvent-containing mixture of ingredients (a) to (d), and at least one solvent, e.g., an aprotic solvent. Preferably, the neat process or solvent-based process is run at a temperature of the neat mixture or solvent-containing mixture of from −20° C. to about 200° C. In some embodiments, the temperature is at least 30° C., and more preferably at least 40° C. In other embodiments, the temperature is 175° C. or lower, more preferably 150° C. or lower, and still more preferably 140° C. or lower. A convenient temperature is about 130° C. Preferably the process of the first or second embodiment independently is run under a pressure of from about 0.9 atmospheres (atm) to about 10 atm (i.e., from about 91 kiloPascals (kPa) to about 1010 kPa). More preferably, the pressure is about 1 atm (i.e., about 101 kPa).

As mentioned before, the processes of the first and second embodiment employ one or more metal-ligand complexes of formula (I), which is described herein using conventional chemical group terminology. As used herein, the term "carbonate" means an ionic substance consisting of zero or one cations $Q^X$ and an anion of the empirical formula $CO_3^{-2}$, the ionic substance having an overall −1 or −2 charge. The term "nitrate" means an ionic substance consisting of an anion of the empirical formula $NO_3^-$, the ionic substance having an overall −1 charge. The term "oxalate" means an ionic substance consisting of zero or one cations $Q^X$ and an anion of the empirical formula $^-OC(O)C(O)O^-$, the ionic substance having an overall −1 or −2 charge. The term "phosphate" means an ionic substance consisting of zero, one, or two cations $Q^X$ and an anion of the empirical formula $PO_4^{-3}$, the ionic substance having an overall −1, −2, or −3 charge. The term "sulfate" means an ionic substance consisting of zero or one cations $Q^X$ and an anion of the empirical formula $SO_4^{-2}$, the ionic substance having an overall −1 or −2 charge. In each of the ionic substances, preferably $Q^X$ independently is an inorganic cation of hydrogen atom, lithium, sodium, potassium, calcium, or magnesium, including hemi calcium and hemi magnesium.

When used to describe certain carbon atom-containing chemical groups (e.g., $(C_1-C_{40})$alkyl), the parenthetical expression of the form "$(C_x-C_y)$," means that the unsubstituted version of the chemical group comprises from a number x carbon atoms to a number y carbon atoms, wherein each x and y independently is an integer as described for the chemical group. Thus, for example, an unsubstituted $(C_1-C_{40})$alkyl contains from 1 to 40 carbon atoms. When one or more substituents on the chemical group contain one or more carbon atoms, the substituted $(C_x-C_y)$ chemical group may comprise more than y total carbon atoms; i.e., the total number of carbon atoms of the carbon atom-containing substituent(s)-substituted $(C_x-C_y)$ chemical group is equal to y plus the sum of the number of carbon atoms of each of the carbon atom-containing substituent(s). Any atom of a chemical group that is not specified herein is understood to be a hydrogen atom.

In some embodiments, each of the X, $R^1$, $L^1$ and $L^2$ groups of the metal-ligand complex of formula (I) is unsubstituted, that is, can be defined without use of a substituent $R^S$. In other embodiments, at least one of the X, $R^1$, $L^1$ and $L^2$ independently contain one or more of the substituents $R^S$. Preferably there are not more than a total of 20 $R^S$, more preferably not more than a total of 10 $R^S$, and still more preferably not more than a total of 5 $R^S$ in metal-ligand complex of formula (I). Where the invention compound contains two or more substituents $R^S$, each $R^S$ independently is bonded to a same or different substituted chemical group.

In some embodiments, at least one $R^S$ is polyfluoro or perfluoro. For present purposes "polyfluoro" and "perfluoro" each count as one $R^S$ substituent. The term "poly" as in "polyfluoro" means that two or more H, but not all H, bonded to carbon atoms of a corresponding unsubstituted chemical group are replaced by a fluoro in the substituted chemical group. The term "per" as in "perfluoro" means each H bonded to carbon atoms of a corresponding unsubstituted chemical group is replaced by a fluoro in the substituted chemical group.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic or non-aromatic, saturated or unsaturated, straight chain or branched chain, cyclic (including mono- and poly-cyclic, fused and non-fused polycyclic) or acyclic, or a combination of two or more thereof; and each hydrocarbon radical and diradical is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned groups independently has a maximum of 20 carbon atoms (e.g., $(C_1-C_{20})$alkyl, $(C_3-C_{20})$cycloalkyl, $(C_3-C_{10})$cycloalkyl-$(C_1-C_{10})$alkylene, $(C_6-C_{20})$aryl, or $(C_6-C_{10})$aryl-$(C_1-C_{10})$alkylene), still more preferably 10 carbon atoms (e.g., $(C_1-C_{10})$alkyl, $(C_3-C_{10})$cycloalkyl, $(C_3-C_6)$cycloalkyl-$(C_1-C_4)$alkylene, $(C_6-C_{10})$aryl, or $(C_6-C_{10})$aryl-$(C_1-C_4)$alkylene).

The term "$(C_1-C_{40})$alkyl" means a saturated straight or branched hydrocarbon radical of from 1 to 40 carbon atoms that is unsubstituted or substituted by one or more $R^S$. Preferably, $(C_1-C_{40})$alkyl has a maximum of 20 carbon atoms, more preferably 10 carbon atoms, still more preferably 6 carbon atoms. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. Preferably, each $(C_1-C_5)$alkyl independently is methyl, trifluoromethyl, ethyl, 1-propyl, or 2-methylethyl.

The term "$(C_6-C_{40})$aryl" means an unsubstituted or substituted (by one or more $R^S$) mono-, bi- or tricyclic aromatic hydrocarbon radical of from 6 to 40 total carbon atoms, of which at least from 6 to 14 are ring carbon atoms, and the mono-, bi- or tricyclic radical comprises 1, 2 or 3 rings, wherein the 2 or 3 rings independently are fused or non-fused and the 1 ring is aromatic and at least of the 2 or 3 rings aromatic. Preferably, $(C_6-C_{40})$aryl has a maximum of 18 carbon atoms, more preferably 10 carbon atoms, still more preferably 6 carbon atoms. Examples of unsubstituted $(C_6-C_{40})$aryl are unsubstituted $(C_6-C_{20})$aryl; unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_6-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Preferably, $(C_3-C_{40})$cycloalkyl has a maximum of 20 carbon atoms, more preferably 10 carbon atoms, still more preferably 6 carbon atoms. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Thus, $(C_1-C_{40})$hydrocarbylene means an unsubstituted or substituted diradical analog of $(C_6-C_{40})$aryl, $(C_3-C_{40})$cycloalkyl, or $(C_2-C_{40})$alkyl, i.e., $(C_6-C_{40})$arylene, $(C_3-C_{40})$cycloalkylene, and $(C_2-C_{40})$alkylene, respectively. More preferably, each of the aforementioned groups independently has a maximum of 20 carbon atoms (e.g., $(C_6-C_{18})$arylene, $(C_3-C_{20})$cycloalkylene, and $(C_2-C_{20})$alkylene), still more preferably 10 carbon atoms (e.g., $(C_6-C_{10})$arylene, $(C_3-C_{10})$cycloalkylene, and $(C_2-C_{10})$alkylene). In some embodiments, the diradicals are on adjacent carbon atoms (i.e., 1,2-diradicals), or spaced apart by one, two, or more intervening carbon atoms (e.g., respective 1,3-diradicals, 1,4-diradicals, etc.). Preferred is a 1,2-, 1,3-, 1,4-, or alpha,omega-diradical, more preferably a 1,2-diradical.

The term "$(C_1-C_{20})$alkylene" means a saturated straight or branched chain diradical of from 1 to 20 carbon atoms that is unsubstituted or substituted by one or more $R^S$. Preferably, $(C_1-C_{20})$alkylene, together with atoms of formula (I) through which the $(C_1-C_{20})$alkylene is bonded, comprise a 5- or 6-membered ring. Examples of unsubstituted $(C_1-C_{20})$alkylene are unsubstituted $(C_1-C_{10})$alkylene, including unsubstituted 1,2-$(C_1-C_{10})$alkylene; —$CH_2$—, —$CH_2CH_2$—, —$(CH_2)_3$—, —$CH_2CHCH_3$, —$(CH_2)_4$—, —$(CH_2)_5$—, —$(CH_2)_6$—, —$(CH_2)_7$—, —$(CH_2)_8$—, and —$(CH_2)_4C(H)(CH_3)$—. Examples of substituted $(C_1-C_{20})$alkylene are substituted $(C_1-C_{10})$alkylene, —$CF_2$—, —$C(O)$—, and —$(CH_2)_{14}C(CH_3)_2(CH_2)_5$— (i.e., a 6,6-dimethyl substituted normal-1,20-eicosylene).

The term "$(C_1-C_{40})$heterohydrocarbyl" means a heterohydrocarbon radical of from 1 to 40 carbon atoms and one or more heteroatoms N (when comprising —N=); O; S; S(O); $S(O)_2$; $Si(R_C)_3$; $P(R^P)$; and $N(R^N)$, wherein independently each $R_C$ is unsubstituted $(C_1-C_{18})$hydrocarbyl, each $R^P$ is unsubstituted $(C_1-C_{18})$hydrocarbyl; and each $R^N$ is unsubstituted $(C_1-C_{18})$hydrocarbyl. The term "$(C_1-C_{40})$heterohydrocarbon" means a parent analog of $(C_1-C_{40})$heterohydrocarbyl. The term "$(C_1-C_{40})$heterohydrocarbylene" means a heterohydrocarbon diradical of from 1 to 40 carbon atoms and one or more heteroatoms $Si(R_C)_3$, $P(R^P)$, $N(R^N)$, N, O, S, S(O), and $S(O)_2$ as defined above. The heterohydrocarbon radical and each of the heterohydrocarbon diradicals independently are on a carbon atom or heteroatom thereof. Each heterohydrocarbon radical and diradical independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each heterohydrocarbon is the same as or different from another.

Preferably, a $(C_1-C_{40})$heterohydrocarbyl independently is unsubstituted or substituted $(C_1-C_{40})$heteroalkyl, $(C_2-C_{40})$heterocycloalkyl, $(C_2-C_{40})$heterocycloalkyl-$(C_1-C_{20})$alkylene, $(C_3-C_{40})$cycloalkyl-$(C_1-C_{20})$heteroalkylene, $(C_2-C_{40})$heterocycloalkyl-$(C_1-C_{20})$heteroalkylene, $(C_1-C_{40})$heteroaryl, $(C_1-C_{20})$heteroaryl-$(C_1-C_{20})$alkylene, $(C_6-C_{20})$aryl-$(C_1-C_{20})$heteroalkylene, or $(C_1-C_{20})$heteroaryl-$(C_1-C_{20})$heteroalkylene. More preferably, each of the aforementioned groups has a maximum of 20 carbon atoms, still more preferably 10 carbon atoms. Thus, a more preferred $(C_1-C_{40})$heterohydrocarbyl independently includes unsubstituted or substituted $(C_1-C_{20})$heterohydrocarbyl, e.g., $(C_1-C_{20})$heteroalkyl, $(C_2-C_{20})$heterocycloalkyl, $(C_2-C_{10})$heterocycloalkyl-$(C_1-C_{10})$alkylene, $(C_3-C_{10})$cycloalkyl-$(C_1-C_{10})$heteroalkylene, $(C_2-C_{10})$heterocycloalkyl-$(C_1-C_{10})$heteroalkylene, $(C_1-C_{20})$heteroaryl, $(C_1-C_{10})$heteroaryl-$(C_1-C_{10})$alkylene, $(C_6-C_{10})$aryl-$(C_1-C_{10})$heteroalkylene, or $(C_1-C_{10})$heteroaryl-$(C_1-C_{10})$heteroalkylene. A still more preferred $(C_1-C_{40})$heterohydrocarbyl independently includes unsubstituted or substituted $(C_1-C_{10})$heterohydrocarbyl, e.g., $(C_1-C_{10})$heteroalkyl, $(C_2-C_{10})$heterocycloalkyl, $(C_2-C_6)$heterocycloalkyl-$(C_1-C_4)$alkylene, $(C_3-C_6)$cycloalkyl-$(C_1-C_4)$heteroalkylene, $(C_2-C_6)$heterocycloalkyl-$(C_1-C_4)$heteroalkylene, $(C_1-C_{10})$heteroaryl, $(C_1-C_5)$heteroaryl-$(C_1-C_5)$alkylene, $(C_6)$aryl-$(C_1-C_4)$heteroalkylene, or $(C_1-C_5)$heteroaryl-$(C_1-C_5)$heteroalkylene. Preferably, any $(C_2-C_{18})$heterocycloalkyl independently is unsubstituted or substituted $(C_2-C_9)$heterocycloalkyl.

The aforementioned heteroalkyl and heteroalkylene groups are saturated straight or branched chain radicals or diradicals, respectively, containing $(C_x-C_y)$ carbon atoms and one or more of the heteroatoms $Si(R_C)_3$, $P(R^P)$, $N(R^N)$, N, O, S, S(O), and $S(O)_2$ as defined above, wherein each of the heteroalkyl and heteroalkylene groups independently are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thia-cyclononyl, and 2-aza-cyclodecyl.

Examples of unsubstituted $(C_1-C_{40})$heteroaryl are unsubstituted $(C_1-C_{20})$heteroaryl, unsubstituted $(C_1-C_{10})$heteroaryl, pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; tetrazol-5-yl; pyridine-2-yl; pyrimidin-2-yl; pyrazin-2-yl; indol-1-yl; benzimidazole-1-yl; quinolin-2-yl; and isoquinolin-1-yl.

The term "$(C_1-C_{40})$heterohydrocarbon" means a molecule comprising from 1 to 40 carbon atoms and from 1 to 4 heteroatoms, the molecule being unsubstituted or substituted, saturated or unsaturated, acyclic or cyclic, straight or branched; the heteroatoms independently being oxygen, nitrogen, sulfur, phosphorous, or arsenic. Where the $(C_1-C_{40})$heterohydrocarbon comprises a neutral ligand, each heteroatom independently may be referred to herein as a "donor heteroatom."

The term "halo" means fluoro (F), chloro (Cl), bromo (Br), or iodo (I) radical. Preferably, halo is fluoro or chloro, more preferably fluoro. The term "halide" means fluoride ($F^-$), chloride ($Cl^-$), bromide ($Br^-$), or iodide ($I^-$) anion.

Preferably, there are no O—O, S—S, or O—S bonds, other than O—S bonds in an S(O) or $S(O)_2$ diradical functional group, in the metal complex of formula (I).

Preferably, each substituted $(C_1-C_{40})$hydrocarbyl excludes and is different than unsubstituted or substituted $(C_1-C_{40})$heterohydrocarbyl (i.e., each substituted $(C_1-C_{40})$hydrocarbyl is as defined in the first embodiment, wherein the substituted $(C_1-C_{40})$hydrocarbyl is not an unsubstituted or substituted $(C_1-C_{40})$heterohydrocarbyl); preferably, each substituted $(C_1-C_{40})$hydrocarbylene excludes and is different than unsubstituted or substituted $(C_1-C_{40})$heterohydrocarbylene; and more preferably a combination thereof.

The term "catalytic amount" means mole percent (mol %) of the catalyst for a catalyzed reaction that is less than 100 mol % of a number of moles of a product-limiting stoichiometric reactant employed in the catalyzed reaction and equal to or greater than a minimum mol % value that is necessary for at least some product of the catalyzed reaction to be formed and detected (e.g., by mass spectrometry), wherein 100 mol % is equal to the number of moles of the product-limiting stoichiometric reactant employed in the catalyzed reaction. The minimum catalytic amount preferably is 0.001 mole percent. Preferably, the catalytic amount of the metal-ligand complex of formula (I) used to prepare the invention catalyst is from 0.01 mol % to 50 mol % of the moles of ethylene or $(C_3-C_{40})$alpha-olefin, whichever is lower. More preferably, the catalytic amount of the metal-ligand complex of formula (I) is at least 0.05 mol %, and still more preferably at least 0.1 mol %. Also more preferably, the catalytic amount of the metal-ligand complex of formula (I) is 40 mol % or less, and still more preferably 35 mol % or less.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero)aromatic rings, if any.

In some embodiments, X is the monodentate ligand comprising the $(C_1-C_{40})$heterohydrocarbon having 1 donor heteroatom, wherein the $(C_1-C_{40})$heterohydrocarbon is $R^MN(R^K)R^L$, $R^KOR^L$, $R^KSR^L$, or $R^MP(R^K)R^L$, wherein the 1 donor heteroatom is the N, O, S, or P, respectively, and each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene.

In some embodiments, X is the polydentate ligand. The term "polydentate ligand" means a bidentate, tridentate, or tetradentate ligand. The terms "monodentate," "bidentate," "tridentate," and tetradentate mean respectively forming one, two, three, or four bonds from a single ligand respectively having one, two, three, or four donor heteroatoms to a single metal ion (e.g., M). Each donor heteroatom independently is oxygen, nitrogen, sulfur, phosphorous, or arsenic. In formula (I), for simplicity X is shown with only one arrow to M, the one arrow respectively indicating 1, 2, 3, or 4 dative bonds depending on whether X is the monodentate, bidentate, tridentate, or tetradentate ligand.

In some embodiments, X is the bidentate ligand. Preferably, the bidentate ligand is $R^MN(R^K)R^L$, $R^KOR^L$, $R^KSR^L$, or $R^MP(R^K)R^L$, wherein one of the 2 donor heteroatoms of the bidentate ligand is the N, O, S, or P, respectively, and the other one of the 2 donor heteroatoms is from a $(C_1-C_{40})$heterohydrocarbyl or $(C_1-C_{40})$heterohydrocarbylene, where $R^K$ is the $(C_1-C_{40})$heterohydrocarbyl, and each of $R^L$ and $R^M$ independently is hydrogen or $(C_1-C_{40})$hydrocarbyl, or $R^L$ and $R^M$ are taken together to form a $(C_2-C_{40})$hydrocarbylene; or $R^K$ and $R^L$ are taken together to form the $(C_1-C_{40})$heterohydrocarbylene, and $R^M$ is hydrogen or $(C_1-C_{40})$hydrocarbyl.

In some embodiments, X is the tridentate ligand. Preferably, the tridentate ligand is $R^MN(R^K)R^L$, $R^KOR^L$, $R^KSR^L$, or $R^MP(R^K)R^L$, wherein one of the 3 donor heteroatoms of the tridentate ligand is the N, O, S, or P, respectively, and the other two of the 3 donor heteroatoms is from a same or different $(C_1-C_{40})$heterohydrocarbyl or $(C_1-C_{40})$heterohydrocarbylene, where at least $R^K$ is the $(C_1-C_{40})$heterohydrocarbyl, and each of $R^L$ and $R^M$ independently is hydrogen, $(C_1-C_{40})$hydrocarbyl, or $(C_1-C_{40})$heterohydrocarbyl, or $R^L$ and $R^M$ are taken together to form a $(C_1-C_{40})$heterohydrocarbylene; or $R^K$ and $R^L$ are taken together to form the $(C_1-C_{40})$heterohydrocarbylene, and $R^M$ is hydrogen, $(C_1-C_{40})$hydrocarbyl, or $(C_1-C_{40})$heterohydrocarbyl.

In some embodiments, M is a metal of any one of Groups 3 to 6. In some embodiments, M is a metal of any one of Groups 7 to 9. In some embodiments, M is a metal of Group 4. More preferably, M is hafnium or zirconium. Still more preferably, M is titanium.

In some embodiments, $R^1$ is a radical group that is a hydrogen atom. More preferably, $R^1$ is a radical group that is a $(C_1-C_{40})$hydrocarbyl, $(C_1-C_{40})$heterohydrocarbyl, halo, $R^KR^LN$—, $R^LO$—, $R^LS$—, $R^LSe$—, $R^KR^LP$—, or $R^KR^L R^MSi$—, wherein each $R^K$, $R^L$, and $R^M$ independently is as defined above. In some embodiments, $R^1$ is $(C_1-C_{40})$hydrocarbyl. In some embodiments, $R^1$ is $(C_1-C_{10})$alkyl or $(C_3-C_{10})$cycloalkyl.

In some embodiments, $R^1$ is taken together with X or Y as described previously to form a respective monoradical $X^R$—$R^{11}$ or $Y^R$—$R^{11}$, the monoradical being part of $R^{11}$, the $R^{11}$ being bonded via the monoradical to the nitrogen atom in formula (I) and the $X^R$ or $Y^R$, respectively, being bonded to the M in formula (I).

In some embodiments, X and Y are taken together as described previously to form a radical $X^R$—$Y^R$, each of the $X^R$ and $Y^R$ being bonded to M in formula (I).

In some embodiments, $R^1$, X, and Y are taken together as described previously to form a monoradical group $X^R$—$Y^{Ra}$—$R^{11}$ or $X^R$—$R^{12}$—$Y^R$, wherein $X^R$ and $Y^R$ are as defined in the first embodiment, $Y^{Ra}$ is a diradical derived from the $R^MN(R^K)R^L$, $R^KOR^L$, $R^KSR^L$, or $R^MP(R^K)R^L$ of Y, and the monoradical of $X^R$—$Y^{Ra}$—$R^{11}$ or $X^R$—$R^{12}$—$Y^R$ is part of $R^{11}$ or $R^{12}$, respectively, $R^{11}$ and $R^{12}$ independently being a $(C_1-C_{40})$hydrocarbylene or $(C_1-C_{40})$heterohydrocarbylene, where for each of $X^R$—$Y^{Ra}$—$R^{11}$ and $X^R$—$R^{12}$—$Y^R$, $X^R$ and $Y^{Ra}$ or $Y^R$, respectively, are bonded to the M in formula (I) and $R^{11}$ or $R^{12}$, respectively, is bonded via the monoradical thereof to the nitrogen atom in formula (I).

In some embodiments, Y is absent. In some embodiments, Y is the neutral ligand described previously for Y in formula (I). In some embodiments, Y is the neutral ligand that is $R^MN(R^K)R^L$, $R^KOR^L$, $R^KSR^L$, $R^MP(R^K)R^L$, wherein each $R^K$, $R^L$, and $R^M$ independently is hydrogen, $(C_1-C_{40})$hydrocarbyl, or $(C_1-C_{40})$heterohydrocarbyl. In some embodiments, $R^K$ and $R^L$ are taken together to form a $(C_2-C_{40})$hydrocarbylene or $(C_1-C_{40})$heterohydrocarbylene and $R^M$ is as defined above.

In some embodiments, one of $R^K$, $R^L$, and $R^M$ is a hydrogen atom and the others of $R^K$, $R^L$, and $R^M$ independently is $(C_1-C_{40})$hydrocarbyl or $(C_1-C_{40})$heterohydrocarbyl, or the others of $R^K$, $R^L$, and $R^M$ are taken together to form a $(C_2-C_{40})$hydrocarbylene or $(C_1-C_{40})$heterohydrocarbylene. In some embodiments, each of $R^K$, $R^L$, and $R^M$ independently is $(C_1-C_{40})$hydrocarbyl or $(C_1-C_{40})$heterohydrocarbyl. In some embodiments, one of $R^K$, $R^L$, and $R^M$ is $(C_1-C_{40})$hydrocarbyl or $(C_1-C_{40})$heterohydrocarbyl, and the others of $R^K$, $R^L$, and $R^M$ are taken together to form a $(C_2-C_{40})$hydrocarbylene or $(C_1-C_{40})$heterohydrocarbylene.

In some embodiments, at least one of $L^1$ and $L^2$ is the anionic ligand having a net formal oxidation state of -1. Preferably, the monoanionic ligand is $((C_1-C_{40})$hydrocarbyl$)_2B^-$, $HO^-$, $(C_1-C_{40})$hydrocarbyl$O^-$, $H_2N^-$, $((C_1-C_{40})$hydrocarbyl$)(H)N^-$, $((C_1-C_{40})$hydrocarbyl$)_2N^-$, $HS^-$, $(C_1-C_{40})$hydrocarbyl$S^-$, $H_2P^-$, $((C_1-C_{40})$hydrocarbyl$)(H)P^-$, or $((C_1-C_{40})$hydrocarbyl$)_2P^-$. In some embodiments, at least one of $L^1$ and $L^2$ is the anionic ligand having a net formal oxidation state of −2. Preferably, the dianionic ligand is the 1,3-dionate of formula (D), $(C_2-C_{40})$hydrocarbylene dicarbanion, $(C_1-C_{40})$heterohydrocarbylene dicarbanion, oxalate, phosphate, or sulfate. More preferably, the dianionic ligand is the tautomer of the 1,3-diene of formula (E), the tautomer being of formula (E1): —$(R^E)_2C$—$C(R^E)$=$C(R^E)$—$C(R^E)_2$— (E1), wherein $R^E$ is as defined in the first embodiment.

In some embodiments, $L^1$ and $L^2$ are taken together as described previously.

In some embodiments of the metal-ligand complex of formula (I), $R^1$ is $(C_1-C_{40})$hydrocarbyl, each of $L^1$, and $L^2$ independently is the $(C_1-C_{40})$hydrocarbyl carbanion, Y is absent, X is a tridentate ligand containing from 1 to 40 carbon atoms and 3 donor heteroatoms, each donor heteroatom independently being oxygen, nitrogen, sulfur, phosphorous, or arsenic, and M is titanium, hafnium, or zirconium. Preferably, the tridentate ligand comprises a cyclic compound, more preferably a cyclic compound having from 6 to 18 ring atoms, and still more preferably a cyclic compound having from 8 to 10 ring atoms. More preferred is a metal-ligand complex of formula (I-A):

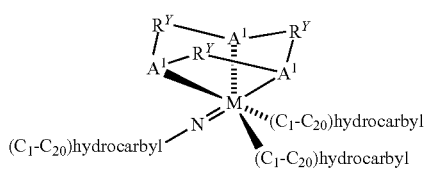

(IA)

wherein each $A^1$ independently is O, S, N(($C_1$-$C_{10}$)alkyl), or P(($C_1$-$C_{10}$)alkyl); each $R^Y$ independently is ($C_1$-$C_3$)alkylene); and each $C_1$-$C_{20}$hydrocarbyl bonded to the M in formula (IA) formally is a carbanion thereof. Still more preferred is wherein each $A^1$ is N(($C_1$-$C_{20}$)alkyl), and even more preferably N(methyl) or N(ethyl). Also more preferably, the $C_1$-$C_{20}$hydrocarbyl bonded to the nitrogen atom in formula (IA) is ($C_1$-$C_{10}$)alkyl or ($C_3$-$C_{10}$)cycloalkyl and each $C_1$-$C_{20}$hydrocarbyl bonded to the M in formula (IA) formally is a carbanion of ($C_1$-$C_{10}$)alkyl or ($C_3$-$C_{10}$)cycloalkyl. Still more preferred is metal-ligand complex of formula (I-A) of Preparation 1 or 2, described later.

Syntheses of some of the metal-ligand complexes of formula (I) may utilize starting materials, intermediates, or reaction products that contain more than one reactive functional group. During chemical reactions, a reactive functional group may be protected from unwanted side reactions by a protecting group that renders the reactive functional group substantially inert to the reaction conditions employed. A protecting group is selectively introduced onto a starting material or intermediate prior to carrying out the reaction step for which the protecting group is needed. Once the protecting group is no longer needed, the protecting group can be removed. It is well within the ordinary skill in the art to introduce protecting groups during a synthesis and then later remove them. Procedures for introducing and removing protecting groups are known, for example, in Protective Groups in Organic Synthesis, 3rd ed., Greene T. W. and Wuts P. G., Wiley-Interscience, New York, 1999. The following moieties are examples of protecting groups that may be utilized to protect amino, hydroxy), or other reactive functional groups: carboxylic acyl groups such as, for example, formyl, acetyl, and trifluoroacetyl; alkoxycarbonyl groups such as, for example, ethoxycarbonyl, tert-butoxycarbonyl (BOC), β,β,β-trichloroethoxycarbonyl (TCEC), and β-iodoethoxycarbonyl; aralkyloxycarbonyl groups such as, for example, benzyloxycarbonyl (CBZ), para-methoxybenzyloxycarbonyl, and 9-fluorenylmethyloxycarbonyl (FMOC); trialkylsilyl groups such as, for example, trimethylsilyl (TMS) and tert-butyldimethylsilyl (TBDMS); and other groups such as, for example, triphenylmethyl(trityl), tetrahydropyranyl, vinyloxycarbonyl, ortho-nitrophenylsulfenyl, diphenylphosphinyl, para-toluenesulfonyl (Ts), mesyl, trifluoromethanesulfonyl, methoxymethyl (MOM), and benzyl. Examples of procedures for removing protecting groups include hydrogenolysis of CBZ groups using, for example, hydrogen gas at about 3.4 atmospheres in the presence of a hydrogenation catalyst such as 10% palladium on carbon, acidolysis of BOC or MOM groups using, for example, hydrogen chloride in dichloromethane or trifluoroacetic acid (TFA) in dichloromethane, reaction of silyl groups with fluoride ions, and reductive cleavage of TCEC groups with zinc metal.

Illustrative procedures for preparing metal-ligand complexes of formula (I) are shown in Scheme 1 that follows.

Scheme 1.

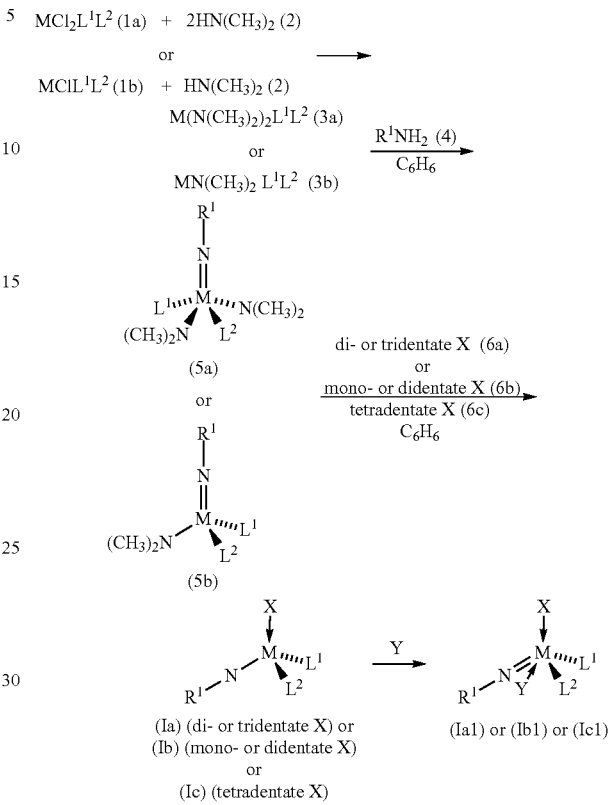

Scheme 1 illustrates a preparation of the metal-ligand complex of formula (I) wherein M, X, and $L^2$ independently are as defined previously for the first embodiment. Application of the preparation of Scheme 1 is found in Adams N., et al., supra. In Scheme 1, the preparation starts with a metal halide derivative (1a) or (1b), wherein the halide is illustrated as containing a chloride (Cl⁻) but could also be, for example, fluoride, bromide, or iodide, is chosen depending on whether X is a tridentate ligand or monodentate ligand, respectively. If X is a bidentate ligand, either of metal halide derivative (1a) or (1b) can be used. Reaction conditions for each reaction shown in Scheme 1 are the same or different and preferably independently are in an aprotic solvent such as, for example, benzene under an inert gas atmosphere (e.g., nitrogen, argon, or helium gas) at a temperature of from −30 degrees Celsius (° C.) to 100° C., preferably about 25° C., followed by isolation, if desired, of reaction product from the resulting reaction mixture under inert gas atmosphere. Reaction of metal halide derivative (1a) or (1b) with dimethylamine (2) (i.e., HN(CH₃)₂) respectively yielded the metal methyl derivative (3a) or (3b). Reaction of the metal methyl derivative (3a) or (3b) with the primary amine (4), wherein $R^1$ is as defined in the first embodiment respectively yielded the imidometal derivative (5a) or (5b). Reaction of the imidometal derivative (5a) or (5b) with a bidentate or tridentate ligand X (6a) or a monodentate or bidentate ligand X (6b) or a tetradentate ligand X (6c), followed by isolation of the reaction product by filtration of the resulting reaction mixture and washing of the resulting filtercake here respectively yielded the metal-ligand complex of formula (Ia), wherein X is a bidentate or tridentate ligand, or the metal-ligand complex of formula (Ib), wherein X is a monodentate or bidentate ligand, or the metal-ligand complex of formula (Ic), wherein X is a tetradentate ligand. Reaction of the metal-ligand complex of any one of formulas (Ia) to (Ic) with optional neutral ligand Y gives a respective metal-ligand complex of formula (Ia1), (Ib1), or (Ic1).

Materials and Methods

General Considerations

All solvents and reagents are obtained from commercial sources and used as received unless indicated otherwise. Purify hexanes solvent through a column of activated alumina followed by a column of Q5 copper oxide on alumina (Cu-0226 S is obtained from (Engelhard subsidiary of BASF Corporation). Purify tetrahydrofuran (THF) and diethyl ether through columns of activated alumina. Synthesize and store all metal complexes in a Vacuum Atmospheres inert atmosphere glove box under a dry nitrogen atmosphere. Record NMR spectra on a 300 megahertz (MHz) Varian INOVA spectrometer. Report chemical shifts in parts per million ($\delta$) versus tetramethylsilane and referenced to residual protons in a deuterated solvent.

Determining percent incorporation of 1-octene and polymer density by Infrared (IR) Spectroscopy: Deposit 140 microliters ($\mu L$) of each polymer solution onto a silica wafer, heat at 140° C. until the 1,2,4-trichlorobenzene (TCB) evaporates, and analyze using a Nicolet Nexus 670 FT-IR with 7.1 version software equipped with an AutoPro auto sampler.

Gel Permeation Chromatography (GPC):

Determine weight average molecular weight ($M_w$) and polydispersity index: Determine $M_w$ and ratio of $M_w/M_n$ (polydispersity index or PDI) using a Polymer Labs™ 210 high temperature gel permeation chromatograph. Prepare samples using 13 mg of polyethylene polymer that is diluted with 16 mL of 1,2,4-trichlorobenzene (stabilized with butylated hydroxy toluene (BHT)), heat and shake at 160° C. for 2 hours.

Determining melting and crystallization temperatures and heat of fusion by Differential Scanning Calorimetry (DSC; DSC 2910, TA Instruments, Inc.)): First heat samples from room temperature to 180° C. at a heating rate of 10° C. per minute. After being held at this temperature for 2 to 4 minutes, cool the samples to −40° C. at a cooling rate of 10° C. per minute; hold the sample at the cold temperature for 2 to 4 minutes, and then heat the sample to 160° C.

Analyzing end groups by proton-nuclear magnetic resonance ($^1$H-NMR) spectroscopy using a Varian 600 MHz NMR instrument and deuterated tetrachloroethane.

Abbreviations (meanings): r.t. (room temperature); g (gram(s)); mL (milliliter(s)); ° C. (degrees Celsius); mmol (millimole(s)); MHz (MegaHertz); Hz (Hertz).

Preparations

Preparations of the Following Metal-Ligand Complexes of Formula (I): dimethyl-(1,1-dimethylethylimino)-(1,4,7-trimethyl-1,4,7-triazacyclononane) titanium (1) and (cyclopentylimino)-dimethyl-(1,4,7-trimethyl-1,4,7-triazacyclononane)titanium (2), Respectively

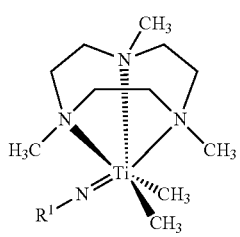

$R^1$ = 1,1-dimethylethyl (1)
$R^1$ = cyclopentyl (2)

Following the procedure generally illustrated in Scheme 1, precatalyst complexes (1) and (2) are prepared.

Preparation 1: Preparation of dichloro-(1,1-dimethylethylimino)-(1,4,7-trimethyl-1,4,7-triazacyclononane)titanium In a 20 mL vial inside a glove box, $TiCl_2(N(CH_3)_2)_2$ (0.35 g, 1.69 mmol) is dissolved in toluene (10 mL) to form a dark red solution. Tertiary-butyl amine (0.18 mL, 1.69 mmol) is added, and the solution immediately turns a light orange color. The solution is stirred at room temperature overnight. To the solution is added via syringe 1,4,7-trimethyl-1,4,7-triazacyclononane, and after a few seconds a solid precipitates from solution. The resulting mixture is stirred at room temperature for 2 hours and filtered to give an orange solid. The orange solid is washed with hexanes and dried under vacuum overnight. Yield (0.48 g, 79%) of dichloro-(1,1-dimethylethylimino)-(1,4,7-trimethyl-1,4,7-triazacyclononane) titanium.

Preparation 2: Preparation of dimethyl-(1,1-dimethylethylimino)-(1,4,7-trimethyl-1,4,7-triazacyclononane)titanium (1)

In a 40-mL vial inside a glove box, dichloro-(1,1-dimethylethylimino)-(1,4,7-trimethyl-1,4,7-triazacyclononane)titanium (0.5 g, 1.38 mmol, Preparation 1) is combined with dry THF (10 mL) and placed in the freezer at −20° C. for 1 hour. The resulting orange mixture (all of the dichloride does not dissolve) is removed from the freezer, and methyl lithium (MeLi) (3 molar (M) in diethoxymethane, 0.18 mL, 0.56 mmol) is added to it. Upon addition, the orange mixture turns into a light yellow solution. After stirring for 1 hour at room temperature, the solvent is removed under vacuum. Hexanes (15 mL) are added, and the resulting mixture is stirred overnight and filtered. The resulting filtrate is placed in the freezer and crystals form. The crystals are collected and dried under vacuum. Yield (0.1 g/23%) of dimethyl-(1,1-dimethylethylimino)-(1,4,7-trimethyl-1,4,7-triazacyclononane)titanium (1).

Preparation 3: Preparation of (cyclopentylimino)-dichloro-(1,4,7-trimethyl-1,4,7-triazacyclononane)titanium In a 60 mL vial inside a glove box, $TiCl_2(N(CH_3)_2)_2$ (0.5 g, 2 4 mmol) is dissolved in toluene (10 mL) to form a dark red solution. To the solution is added cyclopentylamine (0.24 mL, 2.4 mmol), and the solution turns to orange and is stirred at room temperature for 3 hours. To the resulting solution is added 1,4,7-trimethyl-1,7-triazacyclononane (0.47 mL, 2.4 mmol). A solid precipitate forms. The resulting mixture is stirred an additional 18 hours, and yellow-orange solid is collected by filtration. Yield (0.82 g, 91%) of (cyclopentylimino)-dichloro-(1,4,7-trimethyl-1,4,7-triazacyclononane) titanium.

Preparation 4: Preparation of (cyclopentylimino)-dimethyl-(1,4,7-trimethyl-1,4,7-triazacyclononane) titanium (2)

In a 20 mL vial inside a glove box, (cyclopentylimino)-dichloro-(1,4,7-trimethyl-1,4,7-triazacyclononane)titanium (0.4 g, 1.07 mmol, Preparation 3) is combined with dry THF (10 mL).

To the resulting mixture containing an orange solid is added MeLi (3 M in diethoxymethane, 0.75 mL, 2.25 mmol). Upon addition, the orange solid dissolves to form an orange solution. After stirring for 2 hours at room temperature, solvent is removed under vacuum. The resulting solid is crystallized from a mixture of cold hexanes/toluene (2:1) to yield (cyclopentylimino)-dimethyl-(1,4,7-trimethyl-1,4,7-triazacyclononane)titanium (2) as yellow-green crystals (0.1 g/28%).

EXAMPLES OF THE PRESENT INVENTION

General Procedure for Selective Polymerization of ethylene in the Presence of a ($C_3$-$C_{40}$)alpha-olefin (e.g., 1-octene)

Summary: conduct ethylene polymerization reactions at a temperature of 120° C. or 150° C. in a 2 liter (L) batch reactor with feeds of 250 grams (g) of 1-octene; 533 g of mixed alkanes solvent (e.g., isopar-E); 460 pounds per square inch gauge (psig; 3.17 megapascals (MPa)) of ethylene gas pressure; and optionally hydrogen gas as a molecular weight control agent. Prepare catalyst by activating a metal-ligand complex of formula (I) (e.g., the metal ligand complex of Preparation 2 or 4) with 1.2 mole equivalents (relative to the number of moles of the metal ligand complex of formula (I)) of an activating co-catalyst that is either trityl borate or bis(octadecyl)methylammonium tetrakis(pentafluorophenyl)borate ([HNMe($C_{18}H_{37}$)$_2$][B($C_6F_5$)$_4$], abbreviated as BOMATPB). Carry out all polymerization reactions for 10 minutes and then stop them by venting the ethylene to atmospheric pressure (i.e., about 101 kilopascals (kPa)).

Pass all feeds through columns of alumina and Q-5™ catalyst (available from Engelhard Chemicals Inc.) prior to introduction into the 2 L batch reactor. Handle solutions of the metal-ligand complex of formula (I) (e.g., in toluene) and solutions of the activating co-catalysts (e.g., in toluene) in a glove box under an inert gas atmosphere (e.g., nitrogen or argon gas). With stirring, charge the 2-liter batch reactor with about 533 g of mixed alkanes solvent (Isopar E) and 250 g of 1-octene. Add hydrogen gas ($H_2$) as a molecular weight control agent by differential pressure expansion from a 75 mL volume addition tank at 300 psi (2070 kPa). Heat contents of the batch reactor to a temperature of 120° C. or 150° C., and saturate the contents with ethylene at 460 psig (3.4 MPa). Premix dilute toluene solutions of the metal-ligand complex of formula (I) and dilute toluene solutions of the activating co-catalyst. Then transfer the resulting premixture to a catalyst addition tank, and inject the premixture therefrom into the batch reactor. Maintain the polymerization conditions (e.g., temperature) for 15 minutes, adding ethylene on demand to maintain a pressure at or above 5 pounds per square inch (psi) (34.5 kilopascals (kPa)); record weight of ethylene added. Continuously remove heat from the resulting reaction mixture via heat transfer to an internal cooling coil. After the 15 minutes, remove the resulting solution from the batch reactor, quench the reaction with 2-propanol, and stabilize the resulting quenched mixture against further polymerization by adding 10 mL of a toluene solution containing approximately 67 milligrams (mg) of a hindered phenol antioxidant (IRGANOX™ 1010 from Ciba Geigy Corporation) and 133 mg of a phosphorus stabilizer (IRGAFOS™ 168 from Ciba Geigy Corporation). Recover the resulting polyethylene polymer products by drying them for about 12 hours in a temperature-ramped vacuum oven with a starting temperature of about 25° C. and a final temperature of 140° C.

Determine melting and crystallization temperatures of polyethylene polymer products by DSC. Determine $M_w$ and ratio of $M_w/M_n$ (polydispersity index or PDI). Determine mole percent (mol %) 1-octene incorporation and density.

Between polymerization runs, wash the batch reactor out by adding thereto 850 g of mixed alkanes and heating to 150° C. Then empty the batch reactor of the resulting heated mixed alkanes immediately before beginning a new polymerization run.

For perspective, employing metal-ligand complexes that are not of formula (I) in the general procedure prepare polyethylenes having either greater than 5.0 mol %, and in some cases greater than 10 mol %, covalent incorporation of 1-octene; or a melting temperature of less than 128° C., and in some cases less than 100° C.; or a heat of fusion of less than 190 Joules per gram (J/g); or a catalyst efficiency of 1,200,000 or less.

Examples 1A and 1B

Selective Polymerization of ethylene in the Presence of 1-octene to Give a High Density polyethylene Using the Metal-Ligand Complex of Preparation 2

Follow the general procedure described above using the metal-ligand complex of Preparation 2 as the metal-ligand complex of formula (I) in each of two separate runs for Examples 1A and 1B:

Example 1A: using 0.3 micromoles (μmol) of the metal-ligand complex of Preparation 2 and an activating co-catalyst that is trityl borate and a polymerization reaction temperature of 120° C.; and Example 1B: using 0.2 μmol of the metal-ligand complex of Preparation 2 and an activating co-catalyst that is the BOMATPB and a polymerization reaction temperature of 120° C. Results of Examples 1A and 1B are shown below in Table 1.

TABLE 1

Examples 1A and 1B using the metal-ligand complex of Preparation 2

| Ex. No. | MLCP1 (μmol) | Act. Co-cat. (1.2 mol eq.) | Weight of Ethylene added (g) | Yield of HDPE (g) | Catalyst Efficiency (gHDPE/ gMLCP1) | Tm (° C.) | $M_w$ (g/mol) [or $M_n$ (g/mol)] | $M_w/M_n$ | Mol % octene (IR) | Mol % octene (NMR) |
|---|---|---|---|---|---|---|---|---|---|---|
| 1A | 0.3 | BOMATPB | 35.9 | 35.7 | 2,490,000 | 131 | 22,500 | 2.2 | 1.83 | N/a |
| 1B | 0.2 | Trityl borate | 25.8 | 24.5 | 2,560,000 | 130.9 | 11,000 | 2.8 | 3.03 | 1.8 |

Ex. No. = Example Number;
MLCP1 (μmol) = metal-ligand complex of Preparation 2 (micromoles);
Act. Co-cat. (1.2 mol eq.) = activating co-catalyst in 1.2 mole equivalents to micromoles of MLCP1;
Weight of ethylene added (g) = weight of ethylene added in reaction in grams;
Yield of HDPE (g) = yield of high density polyethylene in grams;
Catalyst Efficiency (gHDPE/gMLCP1) = catalyst efficiency calculated by dividing weight in grams of high density polyethylene (HDPE) product by weight in grams of MLCP1 used;
$T_m$ = melting temperature;
$M_w$ (g/mol) [or $M_n$(g/mol)] = weight average molecular weight in grams per mole determined by GPC or, if in brackets, number average molecular weight in grams per mole;
$M_w/M_n$ = polydispersity index (PDI);
Mol % octene (IR) = mole percent of 1-octene incorporated into HDPE as determined by IR spectroscopy;
Mol % octene (NMR) = mole percent of 1-octene incorporated into HDPE as determined by $^1$H-NMR spectroscopy;
N/a means not available.

The resulting catalysts prepared by activating the metal-ligand complexes of Preparation 2 show good catalytic activity in Examples 1A and 1B (catalyst efficiencies of 2,490,000 and 2,560,000, respectively) and produce high density polyethylenes. The high density polyethylene of Example 1A is characterized as having incorporated therein 1.8 mol % of 1-octene as respectively measured by IR or $^1$H-NMR spectroscopy. DSC measurements with the high density polyethylene of Example 1A or 1B give a melting point of 131° C. and a heat of fusion of 255 J/g for the high density polyethylene of Example 1A. $M_w$ for Examples 1A and 1B as determined by GPC is 22,500 grams per mole (g/mol) and 11,000 g/mol, respectively. Number average molecular weight ($M_n$) as determined by GPC for Example 1B is 3,900 g/mol.

End group analysis by $^1$H-NMR spectroscopy of the high density polyethylene of Example 1B shows that the predominant type of unsaturation (93% of total unsaturation) found therein is that of a vinyl (i.e., $H_2C=C(H)$—) group. Moreover, the end group analysis shows that the amount of unsaturation is significantly lower than what a person of ordinary skill in the art would expect based on the previously mentioned 3,900 g/mol $M_n$ as determined by GPC. In fact, calculations show that only about 6.5% of polymer chains of the high density polyethylene of Example 1B contain vinyl groups. This result can be explained by the catalyst used to prepare the high density polyethylene of Example 1B having high sensitivity toward hydrogen ($H_2$)), which high sensitivity predominantly leads to reduction of vinyl groups to give polymer chains having saturated end groups (i.e., $CH_3$—$CH_2$—).

In some embodiments, high sensitivity of catalysts prepared by activating the metal-ligand complex of formula (I) toward hydrogen is a desirable characteristic because it can lead to shorter, and thus more frequent, high density blocks (compared to soft blocks) and which are then statistically more likely to be incorporated at the end of the polymer chains of olefin block copolymers. Hard blocks at the end of the olefin block copolymers lead to better elastomeric properties of such materials.

Examples 2A and 3B

Selective Polymerization of ethylene in the Presence of 1-octene to Give a High Density polyethylene Using the Metal-Ligand Complex of Preparation 4

Follow the general procedure described above using the metal-ligand complex of Preparation 2 as the metal-ligand complex of formula (I).

Example 2A: using 0.5 micromoles (μmol) of the metal-ligand complex of Preparation 4 and an activating co-catalyst that is BOMATPB and a polymerization reaction temperature of 120° C.

Follow the general procedure described above using the metal-ligand complex of Preparation 4 as the metal-ligand complex of formula (I). The resulting catalyst prepared by activating the metal-ligand complex of Preparation 4 shows in Example 2A about 55% (i.e., one half) of the catalyst efficiency as the catalyst efficiency of the catalyst prepared by activating the metal-ligand complex of Preparation 2 aforementioned in Example 1A. The catalyst prepared by activating the metal-ligand complex of Preparation 4 produces the high density polyethylene of Example 2A characterized as having incorporated therein 3.0 mol % of 1-octene as measured by IR spectroscopy, a $M_w$ of 25,000 g/mol, and a melting point of 128° C.

As shown by the above description, including the Examples, the process of the first embodiment employing the metal-ligand complex(es) of formula (I) and one or more activating co-catalysts, and thus the derived catalyst(s), gives a rich polyethylene, and thus the process of the second embodiment would selectively give the ethylene-derived hard segment of an OBC in the presence of a ($C_3$-$C_{40}$)alpha-olefin. A particularly preferred metal-ligand complex(es) of formula (I) is one capable of preparing such a catalyst(s) that can achieve a high selectivity for polymerizing ethylene in the presence of the ($C_3$-$C_{40}$)alpha-olefin in the process of the second embodiment, wherein the high selectivity is characterized as described previously.

While the invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. A continuous process for selectively polymerizing ethylene in the presence of an alpha-olefin and thereby preparing a poly(ethylene-alpha-olefin) block copolymer, the process comprising a step of contacting together a catalytic amount of a catalyst comprising a mixture or reaction product of ingredients (a) and (b); ethylene as ingredient (c); a ($C_3$-$C_{40}$) alpha-olefin as ingredient (d); a chain shuttling agent (CSA) as ingredient (e); and a promiscuous olefin polymerization catalyst useful for copolymerizing ethylene and the alpha-olefin, the promiscuous olefin polymerization catalyst being ingredient (f);

wherein ingredient (a) is one or more metal-ligand complexes of formula (I):

wherein:
X is a neutral monodentate ligand comprising a ($C_1$-$C_{40}$) heterohydrocarbon having one donor heteroatom that is oxygen, nitrogen, sulfur, phosphorous, or arsenic, or a polydentate ligand comprising a ($C_1$-$C_{40}$)heterohydrocarbon having two, three, or four donor heteroatoms, wherein each donor heteroatom is independently oxygen, nitrogen, sulfur, phosphorous, or arsenic;

M is a metal of any one of Groups 3 to 9 of the Periodic Table of the Elements, the metal being in a formal oxidation state of +2, +3, +4, +5, or +6;

Y is absent or is a neutral ligand that is $R^M N$ ($R^K$)$R^L$, $R^K OR^L$, $R^K SR^L$, or $R^M P(R^K)R^L$, wherein each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{40}$)heterohydrocarbylene and $R^M$ is as defined above; or X and Y are taken together to form a radical $X^R$-$Y^R$, the $X^R$ and $Y^R$ each being bonded to M in formula (I), $X^R$ being a neutral monodentate or polydentate ligand radical derived from the ($C_1$-$C_{40}$) heterohydrocarbon of X and $Y^R$ being a neutral ligand radical derived from the $R^M N(R^K)R^L$, $R^K OR^L$, $R^K SR^L$, or $R^M P(R^K)R^L$ of Y;

$R^1$ is a radical group that is a hydrogen atom, ($C_1$-$C_{40}$) hydrocarbyl, ($C_1$-$C_{40}$)heterohydrocarbyl, halo, $R^K R^L N$—, $R^L O$—, $R^L S$—, $R^L Se$—, $R^K R^L P$—, or $R^K R^L R^M Si$—, wherein each $R^K$, $R^L$, and $R^M$ independently is as defined above; or $R^1$ is taken together with X or Y to form a respective monoradical $X^R$—$R^{11}$ or $Y^R$—$R^{11}$, the monoradical being part of $R^{11}$, the $R^{11}$ being bonded via the monoradical to the nitrogen atom in formula (I) and the $X^R$ or $Y^R$, respectively, being bonded to the M in formula (I); or $R^1$, X, and Y are taken together to form a monoradical group $X^R$—$Y^{Ra}$—$R^{11}$ or $X^R$—$R^{12}$—$Y^R$, each $X^R$ and $Y^R$ being as defined above, $Y^{Ra}$ is a diradical derived from the $R^M N(R^K)R^L$, $R^K OR^L$, $R^K SR^L$, or $R^M P(R^K)R^L$ of Y, and the monoradical of $X^R$—$Y^{Ra}$—$R^{11}$ or $X^R$—$R^{12}$—$Y^R$ is part of $R^{11}$ or $R^{12}$, respectively, $R^{11}$ and $R^{12}$ independently being a $(C_1-C_{40})$hydrocarbylene or $(C_1-C_{40})$heterohydrocarbylene, where for each of $X^R$—$Y^{Ra}$—$R^{11}$ and $X^R$—$R^{12}$—$Y^R$, $X^R$ and $Y^{Ra}$ or $Y^R$, respectively, are bonded to the M in formula (I) and $R^{11}$ or $R^{12}$, respectively, is bonded via the monoradical thereof to the nitrogen atom in formula (I);

Each of $L^1$ and $L^2$ independently is an anionic ligand, the anionic ligand independently having a net formal oxidation state of −1 or −2 and independently being hydride, $(C_1-C_{40})$hydrocarbyl carbanion, $(C_1-C_{40})$heterohydrocarbyl carbanion, halide, nitrate, carbonate, phosphate, sulfate, $HC(O)O^-$, $(C_1-C_{40})$hydrocarbyl$C(O)O^-$, oxalate, $HC(O)N(H)^-$, $(C_1-C_{40})$hydrocarbyl$C(O)N(H)^-$, $(C_1-C_{40})$hydrocarbyl$C(O)N((C_1-C_{20})$hydrocarbyl$)^-$, $R^K R^L B^-$, $R^K R^L N^-$, $R^K O^-$, $R^K S^-$, $R^K R^L P^-$, $R^M R^K R^L Si^-$, or 1,3-dionate of formula (D): $R^E$—$C(O^-)$—$C$=$C(=O)$—$R^E$, wherein each $R^E$ independently is H, unsubstituted $(C_1-C_6)$alkyl, phenyl, or naphthyl and each $R^K$, $R^L$, and $R^M$ independently is as defined above; or $L^1$ and $L^2$ are taken together to form a tautomer of a 1,3-diene of formula (E): $(R^E)_2C$=$C(R^E)$—$C(R^E)$=$C(R^E)_2$, wherein each $R^E$ independently is H, unsubstituted $(C_1-C_6)$alkyl, phenyl, or naphthyl; or $L^1$ and $L^2$ are taken together to form a dianionic ligand having a net formal oxidation state of −2 and independently being $(C_2-C_{40})$hydrocarbylene dicarbanion, $(C_1-C_{40})$heterohydrocarbylene dicarbanion, oxalate, phosphate, or sulfate; where $L^1$ and $L^2$ are selected depending on the formal oxidation state of M such that the metal-ligand complex of formula (I) is, in aggregate, neutral;

Each of the aforementioned $(C_1-C_6)$alkyl, $(C_1-C_{40})$heterohydrocarbon, $(C_1-C_{20})$hydrocarbyl, $(C_1-C_{40})$hydrocarbyl, $(C_1-C_{40})$heterohydrocarbyl, $(C_2-C_{40})$hydrocarbylene, and $(C_1-C_{40})$heterohydrocarbylene are the same or different and independently is unsubstituted or substituted with one or more substituents $R^S$; and Each $R^S$ independently is a halo, polyfluoro, perfluoro, unsubstituted $(C_1-C_{18})$hydrocarbyl, $F_3C$—, $FCH_2O$—, $F_2HCO$—, $F_3CO$—, oxo, $R_3Si$—, $RO$—, $RS$—, $RS(O)$—, $RS(O)_2$—, $R_2P$—, $R_2N$—, $R_2C$=$N$—, $NC$—, $RC(O)O$—, $ROC(O)$—, $RC(O)N(R)$—, or $R_2NC(O)$—, wherein each R independently is an unsubstituted $(C_1-C_{18})$hydrocarbyl;

ingredient (b) is one or more activating co-catalysts, or a reaction product thereof, wherein the ratio of total number of moles of the one or more metal-ligand complexes of formula (I) to total number of moles of the one or more activating co-catalysts is from 1:10,000 to 100:1;

the chain shuttling agent (ingredient (e)) functions in the process such that polymer chains are transferred between the catalyst comprising a mixture or reaction product of ingredients (a) and (b) and the promiscuous olefin polymerization catalyst; and the promiscuous olefin polymerization catalyst (ingredient (f)) has a comonomer incorporation index of 15 mole percent of comonomer or higher;

where the contacting step comprises a continuous polymerization process that is performed under olefin polymerizing conditions and prepares a poly(ethylene-alpha-olefin) block copolymer in one polymerization reactor, the poly(ethylene-alpha-olefin) block copolymer comprising a polyethylene in a form of a polyethylene hard segment and a soft segment comprising residuals from the $(C_3-C_{40})$alpha-olefin and ethylene, the polyethylene hard segment being covalently bonded to the soft segment, and the polyethylene hard segment having less than 5 mole percent (mol %) of a residual of the $(C_3-C_{40})$alpha-olefin covalently incorporated therein and the olefin polymerizing conditions having a reaction rate constant $k_{11}$ for adding the ethylene monomer to a reactive chain end comprising an ethylene residual; a reaction rate constant $k_{12}$ for adding a $(C_3-C_{40})$alpha-olefin comonomer to a reactive chain end comprising an ethylene residual; and a reactivity ratio $r_1$ equal to $k_{11}$ divided by $k_{12}$ of greater than 10.

2. The process as in claim 1, wherein the reactivity ratio $r_1$ is greater than 20.

3. The process as in claim 1, wherein the reactivity ratio $r_1$ is greater than 30.

4. The process as in claim 1, wherein the rich polyethylene is characterized as having less than 3.1 mole percent of a residual of the $(C_3-C_{40})$alpha-olefin covalently incorporated therein.

5. The process as in claim 1, wherein each of $R^1$, $L^1$, and $L^2$ independently is $(C_1-C_{40})$hydrocarbyl, Y is absent, X is a tridentate ligand containing from 1 to 40 carbon atoms and 3 donor heteroatoms, each donor heteroatom independently being oxygen, nitrogen, sulfur, or phosphorous, and M is titanium, hafnium, or zirconium, each $(C_1-C_{40})$hydrocarbyl of $L^1$ and $L^2$ formally being a carbanion thereof.

6. The process as in claim 5, the tridentate ligand comprising a cyclic compound.

7. The process as in claim 1, each $(C_1-C_{40})$hydrocarbyl independently being a $(C_1-C_{20})$hydrocarbyl.

8. The process as in claim 7, wherein the metal-ligand complex of formula (I) is a metal-ligand complex of formula (IA):

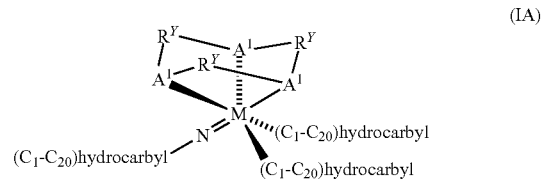

wherein each $A^1$ independently is O, S, $N((C_1-C_{10})$alkyl), or $P((C_1-C_{10})$alkyl); each $R^Y$ independently is $(C_1-C_3)$alkylene); and each $(C_1-C_{20})$hydrocarbyl bonded to the M in formula (IA) formally is a carbanion thereof.

9. The process as in claim 8, wherein each $A^1$ is $N((C_1-C_{20})$alkyl).

10. The process as in claim 9, wherein each $A^1$ independently is N(methyl) or N(ethyl).

11. The process as in claim 9, wherein the $(C_1-C_{20})$hydrocarbyl bonded to the nitrogen atom in formula (IA) is $(C_1-C_{10})$alkyl or $(C_3-C_{10})$cycloalkyl; and each $(C_1-C_{20})$hydrocarbyl bonded to the M in formula (IA) formally is a carbanion of $(C_1-C_{10})$alkyl or $(C_3-C_{10})$cycloalkyl.

12. The process as in claim 8, M being titanium in a formal oxidation state of +4.

13. The process as in claim 12, wherein the metal-ligand complex of formula (IA) is metal-ligand complex (1) or (2):

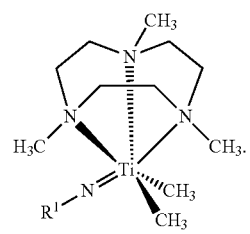

$R^1$ = 1,1-dimethylethyl (1)
$R^1$ = cyclopentyl (2)

14. The process as in claim 1, wherein the activating co-catalyst is a tris(($C_1$-$C_{20}$)hydrocarbyl) borate or a tri($C_1$-$C_{20}$hydrocarbyl)ammonium tetra(($C_1$-$C_{20}$)hydrocarbyl)borane.

15. The process as in claim 14, wherein the activating co-catalyst is a trityl borate or bis(octadecyl)methylammonium tetrakis(pentafluorophenyl)borane.

* * * * *